(12) United States Patent
Heikes et al.

(10) Patent No.: US 7,689,649 B2
(45) Date of Patent: Mar. 30, 2010

(54) RENDERING DESTINATION INSTANT MESSAGING PERSONALIZATION ITEMS BEFORE COMMUNICATING WITH DESTINATION

(75) Inventors: Brian Heikes, Ashburn, VA (US); James A. Odell, Potomac Falls, VA (US); Justin Uberti, Sterling, VA (US); Andrew L. Wick, McLean, VA (US); Xiaoyan Yin, Fairfax Station, VA (US); Xiaopeng Zhang, Oak Hill, VA (US)

(73) Assignee: AOL Inc., Dulles, VA (US)

( * ) Notice: Subject to any disclaimer, the term of this patent is extended or adjusted under 35 U.S.C. 154(b) by 1611 days.

(21) Appl. No.: 10/334,027

(22) Filed: Dec. 31, 2002

(65) Prior Publication Data

US 2003/0222907 A1      Dec. 4, 2003

Related U.S. Application Data

(63) Continuation-in-part of application No. 10/305,015, filed on Nov. 27, 2002.

(60) Provisional application No. 60/384,147, filed on May 31, 2002, provisional application No. 60/416,902, filed on Oct. 9, 2002.

(51) Int. Cl.
*G06F 15/16* (2006.01)

(52) U.S. Cl. .................. 709/204; 709/203; 709/206; 709/219; 709/228; 715/706; 715/758

(58) Field of Classification Search ............... 709/203, 709/204, 206, 217, 219, 228; 715/500.1, 715/706, 753, 758; 725/500.1
See application file for complete search history.

(56) References Cited

U.S. PATENT DOCUMENTS

| | | | |
|---|---|---|---|
| 5,388,202 | A | 2/1995 | Squires |
| 5,657,462 | A | 8/1997 | Brouwer |
| 5,659,692 | A | 8/1997 | Poggio et al. |
| 5,675,752 | A | 10/1997 | Scott |
| 5,745,556 | A | 4/1998 | Ronen |
| 5,793,365 | A | 8/1998 | Tang et al. |

(Continued)

FOREIGN PATENT DOCUMENTS

| | | |
|---|---|---|
| EP | 1 130 869 | 1/2000 |
| EP | 1 011 248 | 6/2000 |
| JP | 11-355619 | 12/1999 |

OTHER PUBLICATIONS

Collaborative Virtual Environments, Designing a Non-Verbal Language for Expressive Avatars, Salem, B & Earle, N. from the Univ. of Plymouth, 2000, ISBN: 1-58113-303-0, p. 93-101.

(Continued)

*Primary Examiner*—Oanh Duong
(74) *Attorney, Agent, or Firm*—Fish & Richardson P.C.

(57) ABSTRACT

Perception of a personalization item in an instant messaging communications session may be enabled by perceiving an identifier corresponding to an intended instant message recipient designated by an instant message sender system, accessing personalization items corresponding to the perceived identifier, and making perceivable the personalization items corresponding to the received identifier to the instant messaging sender system for rendering in an instant messaging application running on the instant messaging sender system, where the personalization items are made perceivable prior to communication with the intended instant message recipient.

107 Claims, 12 Drawing Sheets

U.S. PATENT DOCUMENTS

| | | | |
|---|---|---|---|
| 5,812,126 | A | 9/1998 | Richardson et al. |
| 5,872,521 | A | 2/1999 | Lopatukin et al. |
| 5,880,731 | A * | 3/1999 | Liles et al. ................. 715/758 |
| 5,894,305 | A | 4/1999 | Needham |
| 5,944,780 | A | 8/1999 | Chase et al. |
| 5,963,217 | A | 10/1999 | Grayson et al. |
| 6,128,618 | A | 10/2000 | Eliovson |
| 6,192,396 | B1 | 2/2001 | Kohler |
| 6,205,432 | B1 | 3/2001 | Gabbard et al. |
| 6,219,045 | B1 | 4/2001 | Leahy et al. |
| 6,248,946 | B1 | 6/2001 | Dwek |
| 6,252,952 | B1 | 6/2001 | Kung et al. |
| 6,301,609 | B1 | 10/2001 | Aravamudan et al. |
| 6,324,569 | B1 | 11/2001 | Ogilvie et al. |
| 6,346,952 | B1 | 2/2002 | Shtivelman |
| 6,373,817 | B1 | 4/2002 | Kung et al. |
| 6,389,028 | B1 | 5/2002 | Bondarenko et al. |
| 6,430,604 | B1 | 8/2002 | Ogle et al. |
| 6,434,599 | B1 | 8/2002 | Porter |
| 6,453,294 | B1 | 9/2002 | Dutta et al. |
| 6,487,584 | B1 | 11/2002 | Bunney |
| 6,633,850 | B1 | 10/2003 | Gabbard et al. |
| 6,671,682 | B1 | 12/2003 | Nolte et al. |
| 6,731,323 | B2 | 5/2004 | Doss et al. |
| 6,772,195 | B1 | 8/2004 | Hatlelid et al. |
| 6,784,901 | B1 | 8/2004 | Harvey et al. |
| 6,876,728 | B2 * | 4/2005 | Kredo et al. ............. 379/88.17 |
| 6,961,755 | B2 | 11/2005 | Matsuda |
| 6,983,305 | B2 * | 1/2006 | Danker et al. ................ 709/204 |
| 7,035,803 | B1 * | 4/2006 | Ostermann et al. .......... 704/260 |
| 7,043,530 | B2 * | 5/2006 | Isaacs et al. ................ 709/206 |
| 7,085,259 | B2 | 8/2006 | Wang et al. |
| 7,133,900 | B1 | 11/2006 | Szeto |
| 7,145,678 | B2 | 12/2006 | Simpson |
| 7,194,542 | B2 | 3/2007 | Segan et al. |
| 7,216,143 | B2 * | 5/2007 | Creamer et al. ............. 709/204 |
| 7,249,139 | B2 | 7/2007 | Chuah et al. |
| 2001/0030664 | A1 | 10/2001 | Shulman et al. |
| 2001/0054084 | A1* | 12/2001 | Kosmynin ................... 709/218 |
| 2002/0002542 | A1 | 1/2002 | Ando et al. |
| 2002/0059425 | A1 | 5/2002 | Belfiore et al. |
| 2002/0075303 | A1 | 6/2002 | Thompson et al. |
| 2002/0078153 | A1 | 6/2002 | Chung et al. |
| 2002/0094869 | A1* | 7/2002 | Harkham ..................... 463/42 |
| 2002/0113820 | A1 | 8/2002 | Robinson et al. |
| 2002/0116458 | A1* | 8/2002 | Bricklin et al. ............. 709/204 |
| 2002/0119789 | A1 | 8/2002 | Friedman |
| 2002/0138286 | A1 | 9/2002 | Engstrom |
| 2002/0174026 | A1* | 11/2002 | Pickover et al. ............... 705/26 |
| 2002/0178206 | A1* | 11/2002 | Smith ......................... 709/102 |
| 2002/0181009 | A1* | 12/2002 | Fredlund et al. ............ 358/1.15 |
| 2002/0184309 | A1* | 12/2002 | Danker et al. ................ 709/204 |
| 2003/0005058 | A1* | 1/2003 | Sorotzkin ................... 709/206 |
| 2003/0037112 | A1* | 2/2003 | Fitzpatrick et al. .......... 709/205 |
| 2003/0088789 | A1* | 5/2003 | Fenton et al. ............... 713/201 |
| 2003/0140103 | A1* | 7/2003 | Szeto et al. ................. 709/206 |
| 2003/0160815 | A1* | 8/2003 | Muschetto .................. 345/733 |
| 2003/0182375 | A1* | 9/2003 | Zhu et al. ................... 709/205 |
| 2003/0210265 | A1* | 11/2003 | Haimberg ................... 345/758 |
| 2004/0205480 | A1* | 10/2004 | Moore ..................... 715/500.1 |

OTHER PUBLICATIONS

Netscape 7.0, Preview Release 1, Reviewer's Guide, May 17, 2002, chapter 2, "Internet Messaging," pp. 9-10 and "Instant Messaging with AIM (AOL Instant Messenger,$^{SM}$)," pp. 16-18.

iPlanet Instant Messenger Release 3.0 Quick Reference, Oct. 2001, pp. 1-5.

David Kurlander et al., "International Conference on Computer Graphics and Interactive Techniques—Proceedings of the 23$^{rd}$ annual conference on Computer graphics and interactie techniques," *Comic Chat*, printed from http://portal.acm.org/citation.cfm?id=237260&coll=portal&d1=portal&CFID=3718856&CF . . . on Aug. 9, 2002, pp. 225-236.

Cerulean Studios, Trillian Help Center, Chapter 4, Section 1, printed from http://www.trillian.cc/help/sec-l.php?hchap=4&hsub=1 on Nov. 12, 2002, pp. 1-2.

Cerulean Studios, Trillian Help Center, Tutorials, Chapter 10, Section 5; printed from http://www.trillian.cc/help/sec-1.php?hchap=10&hsub=5 on Nov. 12, 2002, p. 1.

Cerulean Studios, Trillian Help Center, Tutorials, Chapter 10, Section 7, printed from http://www.trillian.cc/help/sec-1.php?hchap=10&hsub=7 on Nov. 12, 2002, pp. 1-2.

Pamela Parker, "Oct. 22, 2001—New Yahoo! Messenger Incorporates Viral Marketing", printed from http://siliconvalley.internet.com/news/article.php/908221 on Oct. 30, 2002, pp. 1-3.

InternetNews.com Staff, Apr. 17, 2002—IAR Bits and Bytes, "Yahoo! Debuts Purina IM Skin, Eagles Tour Promo," printed from http://www.intrnetnews.com/IAR/article.php/1011751 on Oct. 30, 2002, pp. 1-3.

Yahoo! Messenger, Yahoo! Help—IMVironments, printed from http://help.yahoo.com/help/us/mesg/imv/index.html on Oct. 30, 2002, p. 1.

Yahoo! Messenger, Yahoo! Help—IMVironments, printed from http://help.yahoo.com/help/us/mesg/imv/imv-04.html on Oct. 30, 2002, p. 1.

Yahoo! Messenger, Yahoo! Help—IMVironments, printed from http://help.yahoo.com/help/us/mesg/imv/imv-01.html on Oct. 30, 2002, p. 1.

Making your own Yahoo! Messenger IMVironments, printed from http://www.xcflabs.com/~yaroslav/imvironments/instructions.html on Oct. 30, 2002, pp. 1-2.

Bob Woods, Instant Messaging Planet: Public IM: IM—The Cat's Meow, printed from http://www.instantmessagingplanet.com/public/article/0,,10817_1011011,00.html. on Oct. 30, 2002, pp. 1-3.

Roy Santos, Tech TV/Review: Yahoo! Messenger 5.0, printed from http://www.techtv.com/products/print/0,23102,3351041,00.html on Oct. 30, 2002, pp. 1-2.

Rebecca Viksnins, First Look: Yahoo Messenger 5.0—Software Reviews—CNET.com, printed from http://www.cnet.com/software/0-5566362-8-7787365-1.html on Oct. 30, 2002, pp. 1-2.

ZDNet: Yahoo Messenger 5.0 Review, printed from http://www.zdnet.com/supercenter/stories/review/0,12070,538313,00.html on Oct. 30, 2002, pp. 1-3.

ZDNet: Yahoo Messenger 5.0 Overview, printed from http://www.zdnet.com/supercenter/stories/overview/0,12069,538313,00.html on Oct. 30, 2002, pp. 1-3.

Screenshot demonstration of Yahoo Messenger—IMVironments, Nov. 12, 2002, p. 1.

Screenshot Menu, Yahoo! Messenger Preferences, Nov. 12, 2002, p. 1.

Screenshoot demonstration, karl_renner2002—Instant Message, Nov. 12, 2002, p. 1.

Yahoo: Messenger—IMVironments™, printed from http://messenger.yahoo.com/messenger/imv/index.html on Nov. 12, 2002, pp. 1-2.

Yahoo! Help—IMVironments, "How do I send an IMVironment to a friend?", printed from http://help.yahoo.com/help/us/mesg/imv/imv-04.html on Nov. 12, 2002, p. 1.

Yahoo!Messenger, Instantly communicate with all of your online friends . . . ; printed from http://messenger.yahoo.com/ on May 24, 2002, p. 1.

Yahoo!Messenger—IMVironments™, List of Available IMVironments, printed from http://messenger.yahoo.com/messenger/imv/ on May 24, 2002, pp. 1-2.

Screenshot, nikebball87: AIM—nikebball87, printed from http://www.trillian.cc/skins/windowsxp.gif on May 14, 2002, p. 1.

Screenshot, Trillian 7 Skin: GoneBlue v.01, printed from http://www.trillian.cc/skins/goneblue.jpg on May 14, 2002, p. 1.

Screenshot, Dream Green, printed from http://www.trillian.cc/skins/DreamGreen.jpg on May 14, 2002, p. 1.

Screenshot, Trillian chosenOS, printed from http://www.trillian.cc/skins/chosen_trill.jpg on May 14, 2002, p. 1.

Screenshot demonstration, Yahoo Messenger, sboalick—Instant Message, May 14, 2002, p. 1.

Optimizing Linuz's User Interface, Jeff Arnholt, Linux Journal, Issue 19, Specialized Sys. Consultants, Inc., 1995, p. 1-6.

Office Action dated Jul. 30, 2007 (U.S. Appl. No. 10/718,039).

* cited by examiner

RENDERING DESTINATION INSTANT MESSAGING PERSONALIZATION ITEMS BEFORE COMMUNICATING WITH DESTINATION

This application claims priority from U.S. Provisional Application No. 60/384,147, filed May 31, 2002, and U.S. Provisional Application No. 60/416,902, filed Oct. 9, 2002, and is a continuation-in-part of U.S. application Ser. No. 10/305,015, filed Nov. 27, 2002, all of which are incorporated by reference.

TECHNICAL FIELD

This description relates to instant messaging communications and more particularly to personalization of instant messaging communications for an instant message sender.

BACKGROUND

Online service providers facilitate access to information and services by providing interactive User Interfaces (Uls) that help users navigate to desired resources. For example, in the case of a system for communicating using instant messages (IMs), a UI allows an IM sender to invoke actions, such as establishing a communications link, through the selection of screen objects such as icons, windows, and drop-down menus. The design of a UI has a significant impact on an IM sender's online experience. In particular, the icons, the windows, and the menus of a UI may be arranged to enable an IM sender to locate information and services quickly and easily.

SUMMARY

In one general aspect, perception of a personalization item in an instant messaging communications session may be enabled by perceiving an identifier corresponding to an intended instant message recipient designated by an instant message sender system, accessing personalization items corresponding to the perceived identifier, and making perceivable the personalization items corresponding to the received identifier to the instant messaging sender system for rendering in an instant messaging application running on the instant messaging sender system, where the personalization items are made perceivable prior to communication with the intended instant message recipient.

Implementations may include one or more of the following features. For example, one or more personalization items may be stored. Personalization items may be accessed on a host system, and also may be communicated from the host system to the instant message sender system.

The personalization items may be made perceivable at times including prior to communication of an instant message with the intended instant message recipient system, before a communications session is established with the intended instant message recipient system, before the instant message sender system sends a message to the intended instant message recipient system, and before the instant message sender system receives a message from the intended instant message recipient system.

Perceiving the identifier may include receiving an identity of the intended instant message recipient and accessing an identifier associated with the individual intended instant message recipient based upon the received identity. Receiving the identifier may also include receiving a location of the personalization item, such as, for example, a location on the host system. The identifier may also include an item type, a data size, a flag such as a custom item flag, an official item flag, a banned item flag, and a redirect to different item flag.

The personalization item may include a graphic, such as an icon, a sound, wallpaper capable of being rendered on an instant messaging application user interface, an animation sequence, a video segment, and a customized binary object provided by the intended instant message recipient. The personalization item may be provided by a party other than the intended instant message recipient, and may be enabled to be rendered in consideration of a payment.

The personalization item may be configured to expire upon the occurrence of a predetermined event including the passage of a predetermined length of time or on passage of a predetermined date or a predetermined number of uses. If it is determined that the personalization item has expired, access to the personalization item may be disallowed. If it is determined that the personalization item has been banned, access to the personalization item may be disallowed.

In another general aspect, perception of a personalization item in an instant messaging communications session may be enabled by rendering, on an instant message sender system, an instant messaging application user interface for an instant messaging communications session involving at least an intended instant message recipient and an instant message sender and rendering, at the instant message sender system, a personalization item associated with the instant message recipient prior to communication with the intended instant message recipient system.

Implementations may include one or more of the following features. For example, the personalization item may be rendered at the instant message sender system prior to communication of an instant message with the intended instant message recipient system., before a communications session is established with the intended instant message recipient system, before the instant message sender system sends a message to the intended instant message recipient system, or before the instant message sender system receives a message from the intended instant message recipient system.

The identifier may be associated with the personalization item, the personalization item may be obtained from a source other than a message used to obtain the identifier, and the personalization item may be rendered at the instant message sender system. The identifier may include a location of the personalization item. The identifier also may include an item type, a data size, and a flag such as a custom item flag, an official item flag, a banned item flag, or a redirect to different item flag.

Obtaining the identifier may include sending an identity of the intended instant message recipient to an instant message host system, where the instant message host system stores one or more identifiers associated with one or more personalization items for the intended instant message recipient, and receiving an identifier associated with the individual intended instant message recipient in a message from the instant message host system. Obtaining the identifier also may include locating the identifier at the intended instant message recipient system and retrieving the identifier from a remote data store.

Obtaining the personalization item may include determining whether the personalization item associated with the received identifier is available at the instant message sender system, retrieving the personalization item from the instant message sender system if the personalization item is available at the instant message sender system, and requesting the personalization item from a remote source and receiving the personalization item from the remote source at the instant message sender system if the personalization item is not available at the instant message sender system. The identifier may be received upon a change in a presence state of the intended instant message recipient.

The personalization item may include a graphic, such as an icon, a sound, wallpaper capable of being rendered on an instant messaging application user interface, an animation sequence, a video segment, and a customized binary object provided by the intended instant message recipient. The personalization item may be provided by a party other than the intended instant message recipient and may be enabled to be rendered in consideration of a payment. The personalization item may be updated, and may be configured to expire upon the occurrence of a predetermined event, including the passage of a predetermined length of time or on passage of a predetermined date or a predetermined number of uses. If it is determined that the personalization item has expired, display of the personalization item may be disallowed. If it is determined that the personalization item has been banned, display of the personalization item may be disallowed.

Requesting the personalization item may include identifying the remote source, requesting the personalization item from an instant messaging host, or requesting the personalization item from a third-party server. The third-party server includes a server authorized as a partner to an instant messaging host. The personalization item may include any of the items noted above. The personalization item may be provided by a third party, and may be enabled to be rendered in consideration of a payment. The personalization item also may be configured to expire upon the occurrence of a predetermined event such as, for example, the passage of a predetermined length of time, the passage of a predetermined date, or a predetermined number of uses.

Aspects of the IM personalization may be implemented by an apparatus and/or by a computer program stored on a computer readable medium. The computer readable medium may comprise a disc, a client device, a host device, and/or a propagated signal. In addition, aspects of the IM personalization may be implemented in a client/host context or in a standalone or offline client device. The IM personalization items may be rendered in a client/host context and may be accessed or updated through a remote device in a client/host environment. The IM personalization items also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

Figure 1:
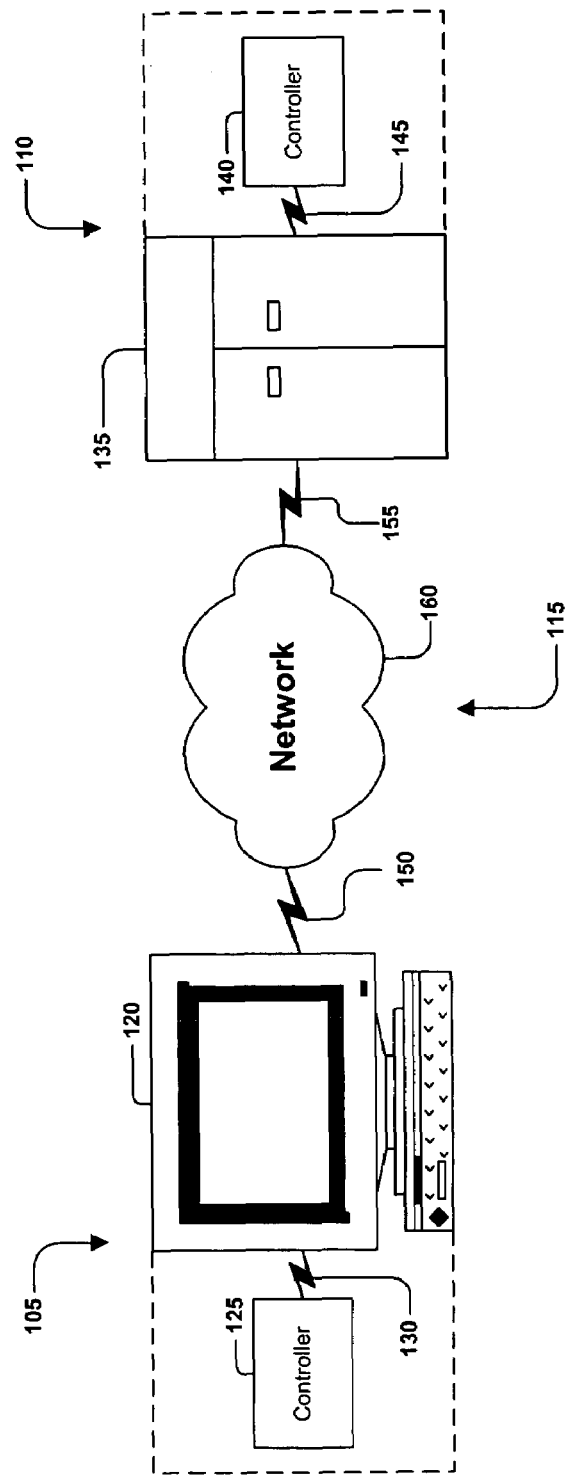
FIGS. 1-4 are block diagrams of an exemplary communications system.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or may be dedicated to a particular geographic region.

DETAILED DESCRIPTION

It is possible, through the systems and techniques described herein, to make personalization items of an intended IM recipient perceivable to an IM sender in a communications interface of the IM sender (1) immediately upon opening the interface, (2) before sending a message or other communication to the IIM recipient, and/or (3) before receipt of a message or other communication from the IM recipient. As such, immediately upon opening a communication interface and identifying a potential message recipient, an IM sender may perceive a personalization item established for or selected by that potential message recipient, which personalization items may not otherwise be made available to the IM sender until communications are sent or received with respect to that potential message recipient.

Personalization items may represent a user or a characteristic of the intended IM recipient, and may include user-selectable binary objects. For example, personalization items include images, such as wallpaper, that are rendered in a location having a contextual placement on a user interface. The contextual placement typically indicates an association with the user represented by the wallpaper. For example, the wallpaper may be rendered in an area where messages from the IM recipient are to be displayed, or as a chrome (i.e., border) around a dialog area on a user interface. Personalization items also may include icons such as buddy icons and mini-buddy icons, sounds, animation, video clips, and emoticons (e.g., smileys). Personalization items for the intended recipient may be known or unknown to the IM sender, and they may or may not be stored at the IM sender system or be otherwise associated with that IM sender prior to the communication session in which they are displayed using the systems and techniques described herein.

One or more personalization items of an intended IM recipient may be rendered at the IM sender system. An identifier corresponding to one or more personalization items of the IM recipient is obtained by the IM sender. For instance, an identifier may identify a particular personalization item, a group of personalization items, or a user name or other identity may be mapped to one or more personalization items or groups.

The IM sender system may use the identifier to identify one or more personalization items associated with the IM recipient, and to locate perceivable content corresponding to the identifier. For instance, an identifier may be used as a basis for determining if one or more corresponding personalization items are available locally at the IN sender system, and, if so, the identifier may be used to retrieve the corresponding personalization item(s). If the personalization item(s) are not available locally at the IM sender system, the IM sender system may use the identifier as a basis for generating one or more requests for the personalization item(s) from another location, such as an IM host system or another remotely-accessible data store such as the IM recipient system, or a remote or third-party server (e.g., a server accessible through the Internet).

Identifiers may be retrieved before, during, or after receipt of an instant message or other communication from the IM recipient. For example, the identifiers may be retrieved upon the opening of a communications user interface (UI) by the IM sender or after opening of the UI but before receipt of an instant message or other communication from the IM recipient.

The IM sender system may retrieve the identifiers from a remote location such as those noted above. The identifiers may be stored at the remote location and associated with a screen name or other user identity of the IM recipient. The IM sender system may send the screen name or other user identity of the IM recipient to the remote location where it is then associated with the corresponding identifiers of the IM recipient, and the IM sender system may receive the corresponding identifiers from the remote location. For instance, the IM host may store identifiers associated with the screen name of an IM recipient. The IM sender system passes the screen name of the IM recipient to the IM host, and the IM host returns the identifiers associated with the passed screen name to the IM sender system. In another implementation, a remotely accessible data store may retrieve and send the personalization items themselves to the IM sender rather than sending the identifiers.

In another example, the IM sender system may locally store the identifiers in association with a screen name or other user identity of the IM recipient. The IM sender system may then retrieve the locally-stored identifiers based on the screen name or other user identity of the IM recipient. In another implementation, the IM sender system may retrieve the personalization items themselves rather than the identifiers.

Personalization items may be made available to the IM sender system based on a selecting process. The personalization items to be made perceivable to the IM sender may be selected manually by the IM recipient or may be automatically selected for the IM recipient. Identifiers for selected personalization items may be associated with a screen name or other identifying information for the IM recipient. For example, the identifiers associated with the screen name of a potential IM recipient may be stored locally at the IM sender system, or the IM sender system may retrieve such identifiers from a remotely-accessible data store such as the IM host system, the IM recipient system, or those noted above.

Personalization items of the IM recipient may be rendered to the IM sender before correspondence is initiated or communications are established by the recipient and without previously having received an IM message from the IM recipient. Once the IM sender system locates or receives the one or more personalization items associated with a intended destination recipient, the IM sender system renders the one or more personalization items for perception by the IM sender. Also, the personalization items of the IM sender may be rendered to the IM recipient in the manner described for rendering the personalization items of the IM recipient to the IM sender.

Typically, a personalization item is rendered upon the occurrence of one or more particular events. For example, a customized sound and/or a personalized icon or wallpaper selected by an IM recipient may be made perceivable to an IM sender when the IM sender initiates an IM communications session with the IM recipient by, for example, opening an IM communications window. As an example, a particular sound may be played or an icon may be displayed at the IM sender system when changes are experienced in presence or state of the IM recipient with whom they communicate changes (e.g., when the IM recipient or other IM participant logs on, logs off, becomes inactive, or enables or disables the IM sender's ability to detect the IM recipient's presence).

In one implementation, the IM sender may not change the personalization items of an IM recipient. An IM recipient may choose to have different personalization items displayed for different IM senders. Once a personalization item is designated by an IM recipient, the personalization item is typically made available for perception by the IM sender automatically. The personalization items may also be selected automatically for an IM recipient based upon a characteristic of the IM sender.

Typically, IM communications involve an instantaneous or nearly instantaneous communication between two users, where each user is able to transmit, receive and display communicated information. Additionally, although IM communications may occur in the absence of online presence information, IM communications generally involve the display and perception of online presence information regarding other selected users ("buddies"). IM communications may be machine-to-machine communications that occur without intervention by or communication through an instant messaging server after a communication session is established or authentication is performed. Examples of IM communications exist over AIM (America Online Instant Messenger), AOL (America Online) Buddy List and Instant Messages, Yahoo Messenger, MSN Messenger, and ICQ, among others. Although discussed below primarily with respect to IM applications, other implementations are contemplated for providing similar functionality in platforms and online applications such as chat, e-mail, and streaming media applications.

Figure 2:
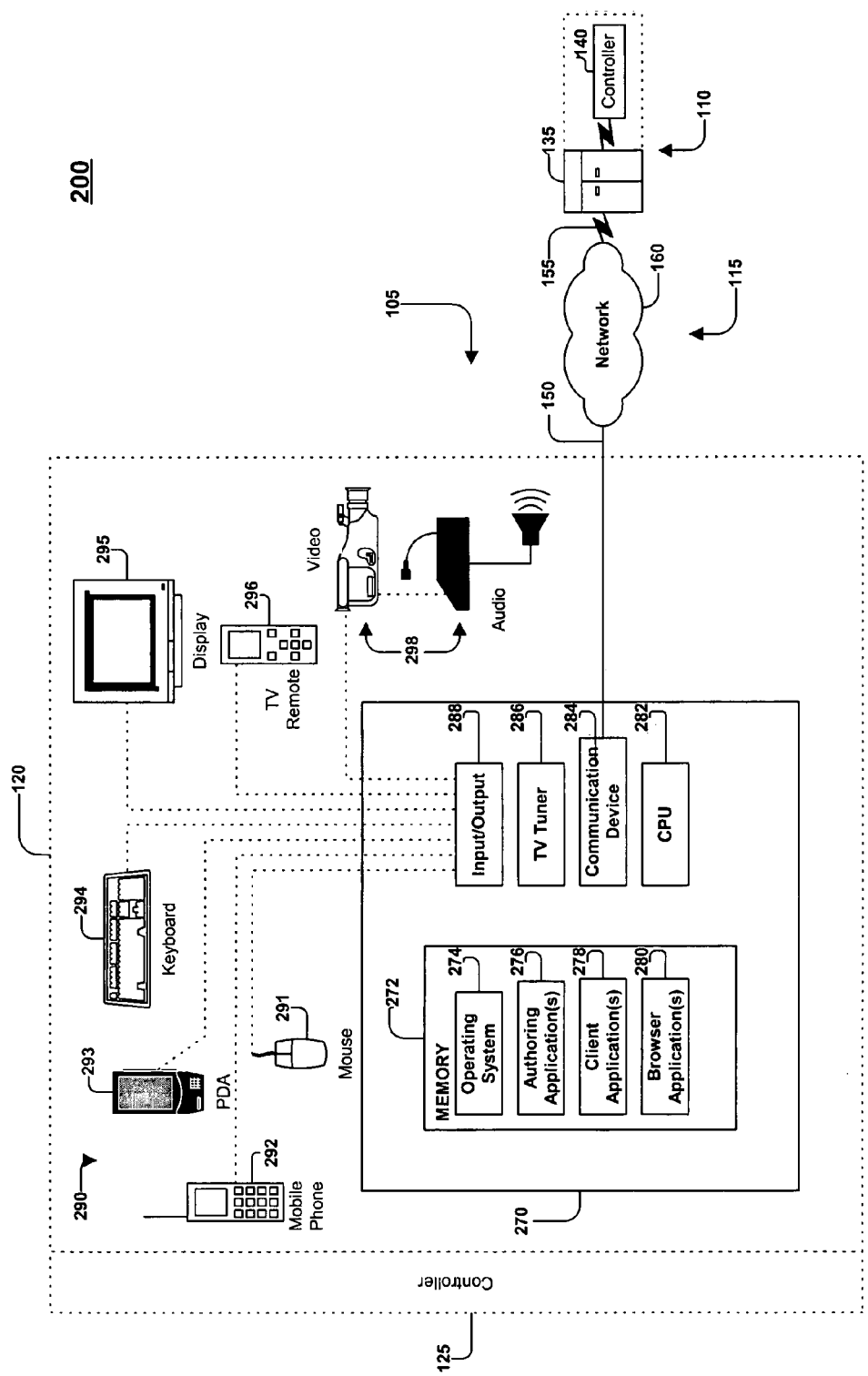

For illustrative purposes, FIGS. 1 and 2 show an example of a communications system for implementing techniques for transferring electronic data.

Referring to FIG. 1, a communications system 100 is capable of delivering and exchanging data between an IM sender system 105 and a host system 110 through a communications link 115. The IM sender system 105 typically includes one or more client devices 120 and/or client controllers 125, and the host system 110 typically includes one or more host devices 135 and/or host controllers 140. For example, the IM sender system 105 or the host system 110 may include one or more general-purpose computers (e.g., personal computers), one or more special-purpose computers (e.g., devices specifically programmed to communicate with each other and/or the IM sender system 105 or the host system 110), or a combination of one or more general-purpose computers and one or more special-purpose computers. The IM sender system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 that provides direct or indirect communication between the IM sender system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including an IM sender system 105 communicating with a host system 110 through a communications link 115.

The IM sender system 105 includes a client device 120 that typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™M, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 120. For example, the mobile phone 292 or the PDA 293 may include computing and networking capabilities and function as a client device 120 by accessing the delivery network 160 and communicating with the host system 110. Furthermore, the IM sender system 105 may include one, some or all of the components and devices described above.

Figure 3:
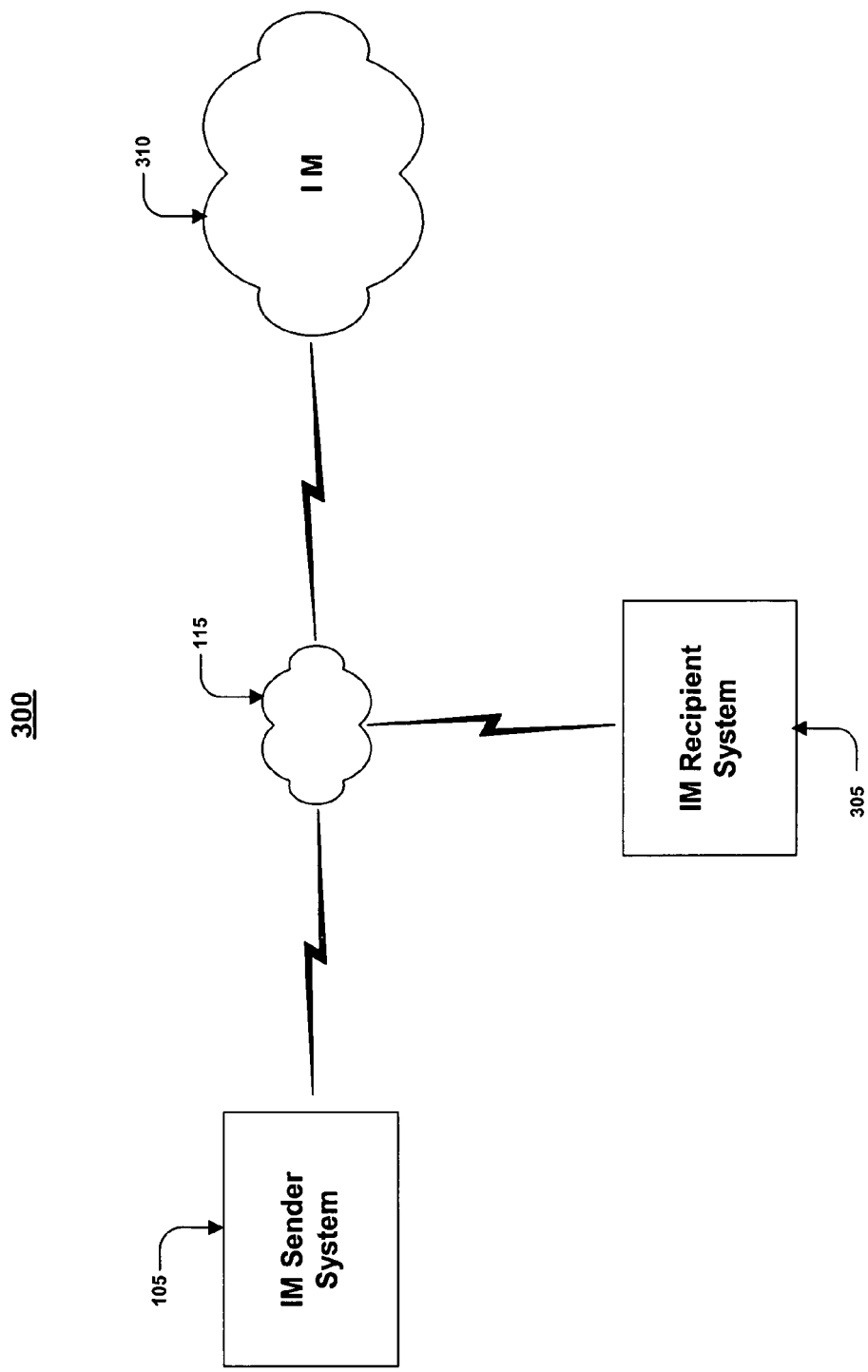

FIG. 3 illustrates a communications system 300 including an IM sender system 105 communicating with an IM recipient system 305 and an IM host system 310 through a communication link 115. Such a communications system may be used by users of IM service providers, such as, for example, AIM, ICQ, Yahoo Messenger, and Microsoft Messenger.

In one implementation, the IM host system 310 may have characteristics similar to those described above with respect to the host system 110, the IM recipient system 305 may have characteristics similar to those described above with respect to the IM sender system 105, and the IM sender system 105 and the IM recipient system 305 may include communication software to enable users of the client systems to access the IM host system 310.

The IM host system 310 may support IM services irrespective of an IM sender's network or Internet access. Thus, the IM host system 310 may allow users to send and receive IMs, regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

To access the IM host system 310 to begin an IM session in the implementation of FIG. 3, the IM sender system 105 establishes a connection to the IM host system 310. Once a connection to the IM host system 310 has been established, the IM sender system 105 may directly or indirectly transmit data to and access content from the IM host system 310. By accessing the IM host system, an IM sender can use the IM client application to view whether particular users ("buddies") are online, exchange IMs with particular buddies, participate in group chat rooms, trade files such as pictures, invitations or documents, find other buddies with similar interests, get customized information such as news and stock quotes, and search the Web. IM recipient system 305 may be similarly manipulated to establish contemporaneous connection with IM host system 310.

Once connectivity is established, an IM sender who is using IM sender system 105 may view whether an IM recipient using IM recipient system 305 is online, and typically may view whether the IM recipient is able to receive IMs. If the IM recipient is online, the IM sender may exchange IMs with the IM recipient.

In one implementation, the IMs sent between IM sender system 105 and IM recipient system 305 are routed through IM host system 310. In another implementation, the IMs sent between IM sender system 105 and IM recipient system 305 are routed through a third party server (not shown), and, in some cases, are also routed through IM host system 310. In yet another implementation, the IMs are sent directly between IM sender system 105 and IM recipient system 305.

Figure 4:
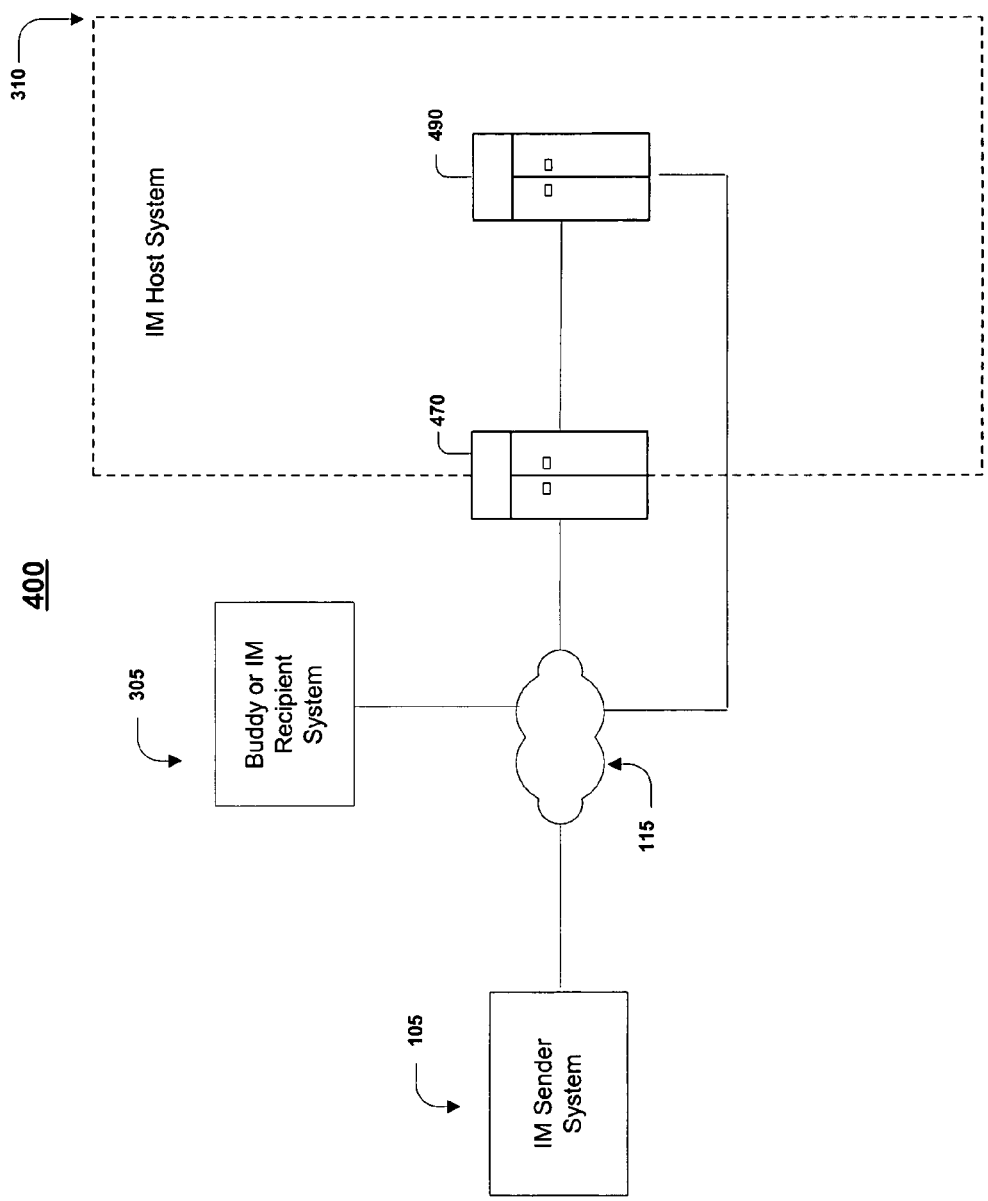

FIG. 4 illustrates a communications system 400 including an IM sender system 105 communicating with an IM recipient system 305 and an IM host system 310 through a communication link 115. System 400 illustrates a possible implementation of the communications system 300 of FIG. 3.

In system 400, the IM host system 310 includes a login server 470 for enabling access by users and routing communications between the IM sender system 105 and other elements of the IM host system 310. The IM host system 310 also includes an IM server 490. To enable access to and facilitate interactions with the IM host system 310, the IM sender system 105 and the IM recipient system 305 may include communication software, such as for example, an OSP client application and/or an IM client application.

As described with respect to FIG. 3, the IM host system 310 may support IM services irrespective of an IM sender's network or Internet access. Thus, the IM host system 310 may allow users to send and receive IMs, regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

In one implementation, the IM sender system 105 establishes a connection to the login server 470 in order to access the IM host system 310 and begin an IM session. The login server 470 typically determines whether the particular IM sender is authorized to access the IM host system 310 by verifying the IM sender's identification and password. If the IM sender is authorized to access the IM host system 310, the login server 470 usually employs a hashing technique on the IM sender's screen name to identify a particular IM server 490 within the IM host system 310 for use during the IM sender's session. The login server 470 provides the IM sender (e.g., IM sender system 105) with the IP address of the IM server 490, gives the IM sender system 105 an encrypted key, and breaks the connection. The IM sender system 105 then uses the IP address to establish a connection to the particular IM server 490 through the communications link 115, and obtains access to the IM server 490 using the encrypted key. Typically, the IM sender system 105 will be able to establish an open TCP connection to the IM server 490. The IM recipient system 305 establishes a connection to the IM host system 310 in a similar manner.

In one implementation, the IM sender system 105 may directly or indirectly transmit data to and access content from the IM server 490 once a connection to the IM server 490 has been established. By accessing the IM server, an IM sender can leverage the IM client application to determine whether particular users ("buddies" or potential IM recipients) are online, exchange IMs with particular buddies, participate in group chat rooms, trade files such as pictures, invitations or documents, find other buddies with similar interests, get customized news and stock quotes, and search the Web. For example an IM sender who is using IM sender system 105 may view whether a buddy using IM recipient system 305 is online, and if so, may exchange IMs with that buddy. In one implementation, the IMs sent between IM sender system 105 and IM recipient system 305 are routed through IM host system 310. In another implementation, the IMs sent between IM sender system 105 and IM recipient system 305 are routed through a third party server (not shown) and, in some cases, are also routed through IM host system 310. In yet another implementation, the IMs are sent directly between IM sender system 105 and IM recipient system 305.

In one implementation, the IM host system 310 also includes a user profile server (not shown) connected to a database (not shown) for storing large amounts of user profile data. The user profile server may be used to enter, retrieve, edit, manipulate, or otherwise process user profile data. In one implementation, an IM recipient's profile data includes, for example, the IM recipient's screen name, buddy list, identified interests, and geographic location. The IM recipient may enter, edit and/or delete profile data using an installed IM client application on the IM recipient system 305 to interact with the user profile server.

FIGS. 5, 10, 11, and 12 illustrate exemplary procedures 500, 1000, 1100, and 1200 to make a personalization item selected by an intended IM destination recipient perceivable to the IM sender during an instant messaging communications session, and, in particular, to render the personalization item associated with an intended IM recipient to the IM sender prior to the communication of an instant message with the intended recipient system.

Procedures 500, 1000, 1100, and 1200 generally involve rendering a personalization item and may be implemented by any type of hardware, software, device, computer, computer system, equipment, component, program, application, code, storage medium, or propagated signal. In one implementation, a host 110 may be used in place of the IM host 310. Furthermore, although not shown in FIGS. 5, 10, 11, and 12, the IM sender system 105 and the IM host system 310 may be directly or indirectly interconnected through known or described delivery networks, examples of which are described with respect to network 160.

The procedures 500, 1000, 1100, and 1200 may be implemented in a client/host context, or a standalone or offline client context. For example, while some functions of procedures 500, 1000, 1100, and 1200 may be performed entirely by the IM sender system 105, other functions may be performed by the IM host system 310 or the collective operation of the IM sender system 105 and the IM host system 310. For instance, a personalization item may be rendered entirely by the IM sender system 105, or the personalization item may be rendered based upon information provided to the IM sender system 105 by the IM host system 310.

The personalization item may be rendered by the standalone/offline device and may be accessed or updated through a remote device in a non-client/host environment such as, for example, a LAN server serving an end user or a mainframe serving a terminal device. Thus, the procedures 500, 1000, 1100, and 1200 described below may be implemented for any OSP, ISP, browser and/or other software program having a graphical user interface, such as programs for instant messaging, chat, electronic mail and stand-alone browsers.

Figure 5:
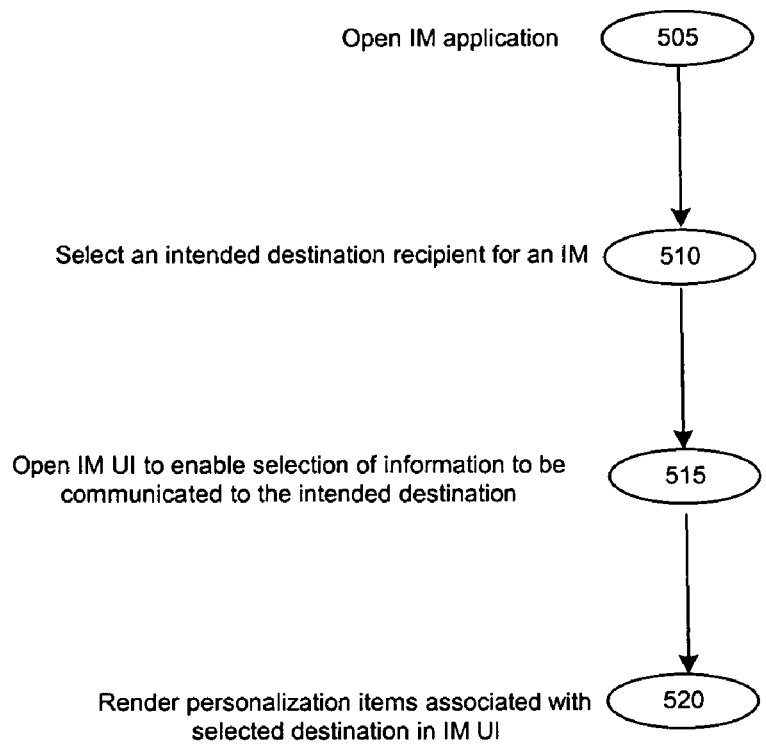
FIGS. 5 and 10 are flow charts of exemplary processes that may be implemented by systems such as those of FIGS. 1-4.
Figure 6:
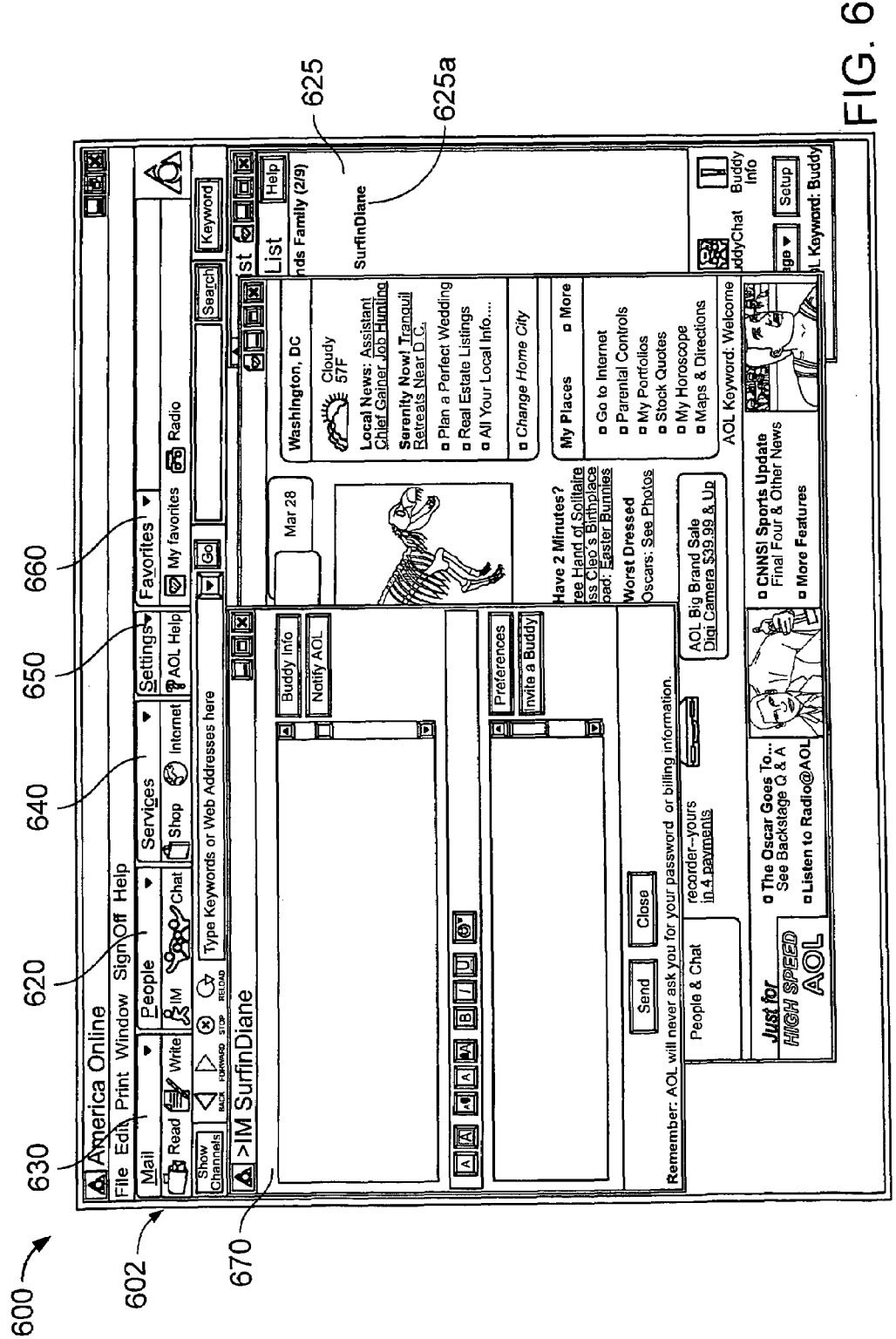
FIGS. 6-9 are illustrations of different graphical user interfaces that may be implemented by systems such as those of FIGS. 1-4 when executing processes such as those of FIGS. 5 and 10 and 11 and 12.

Referring to FIG. 5, in the procedure 500, the IM sender opens an IM application on the IM sender system 105 (step 505). FIG. 6 describes an exemplary interface available to the IM sender, which may be used to open an IM application on the IM sender system and which will be described below.

Next, an intended destination recipient (hereinafter "IM recipient") is selected (step 510). FIG. 6 illustrates an exemplary interface available to the IM sender, which will be described below, and which may be used to select an intended destination recipient.

Figure 7:
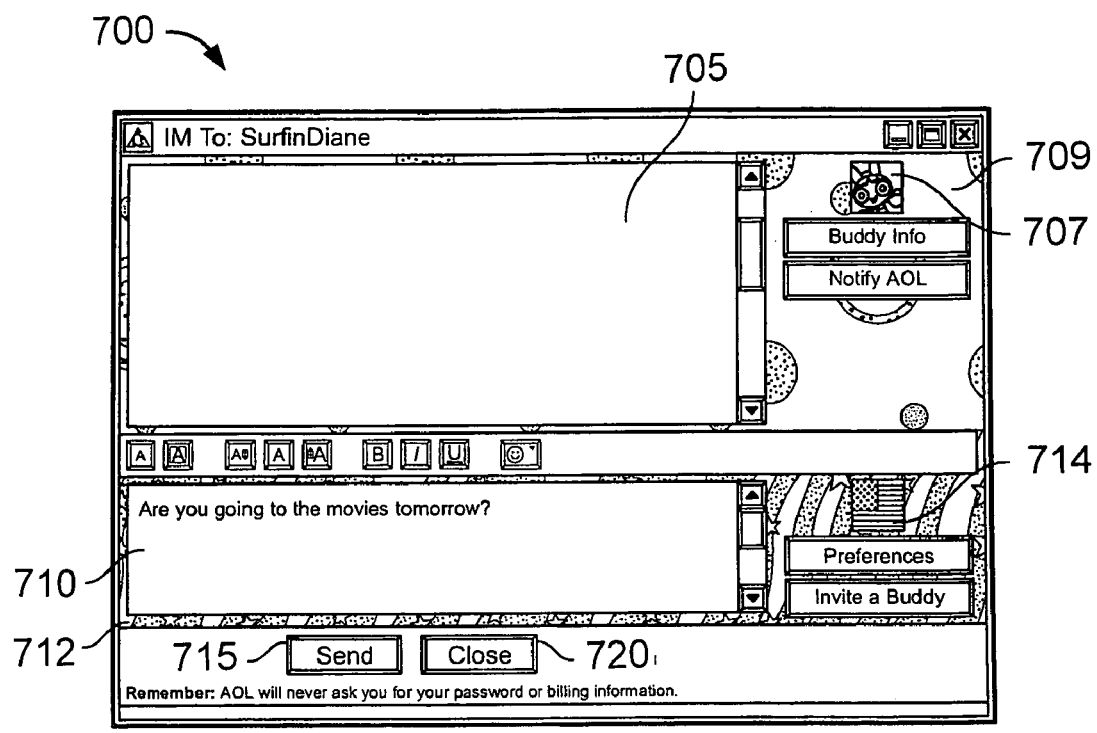
Figure 8:
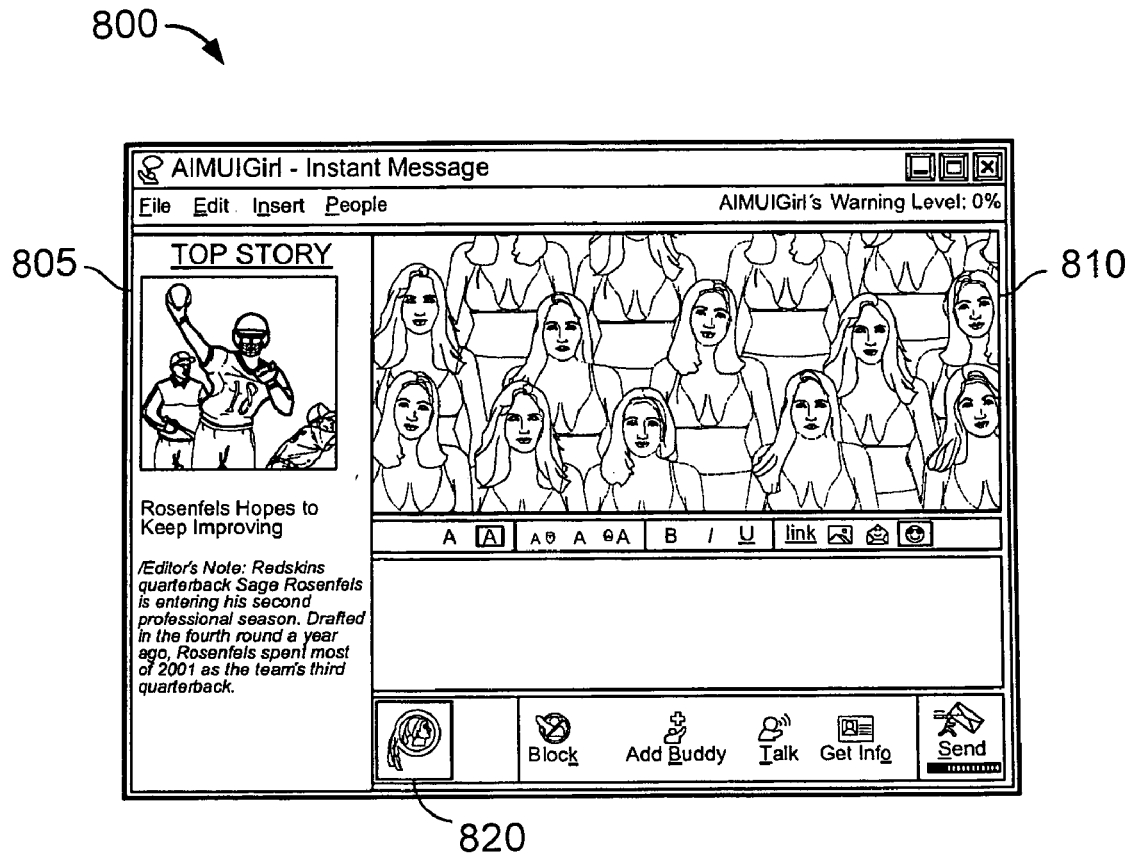
Figure 9:
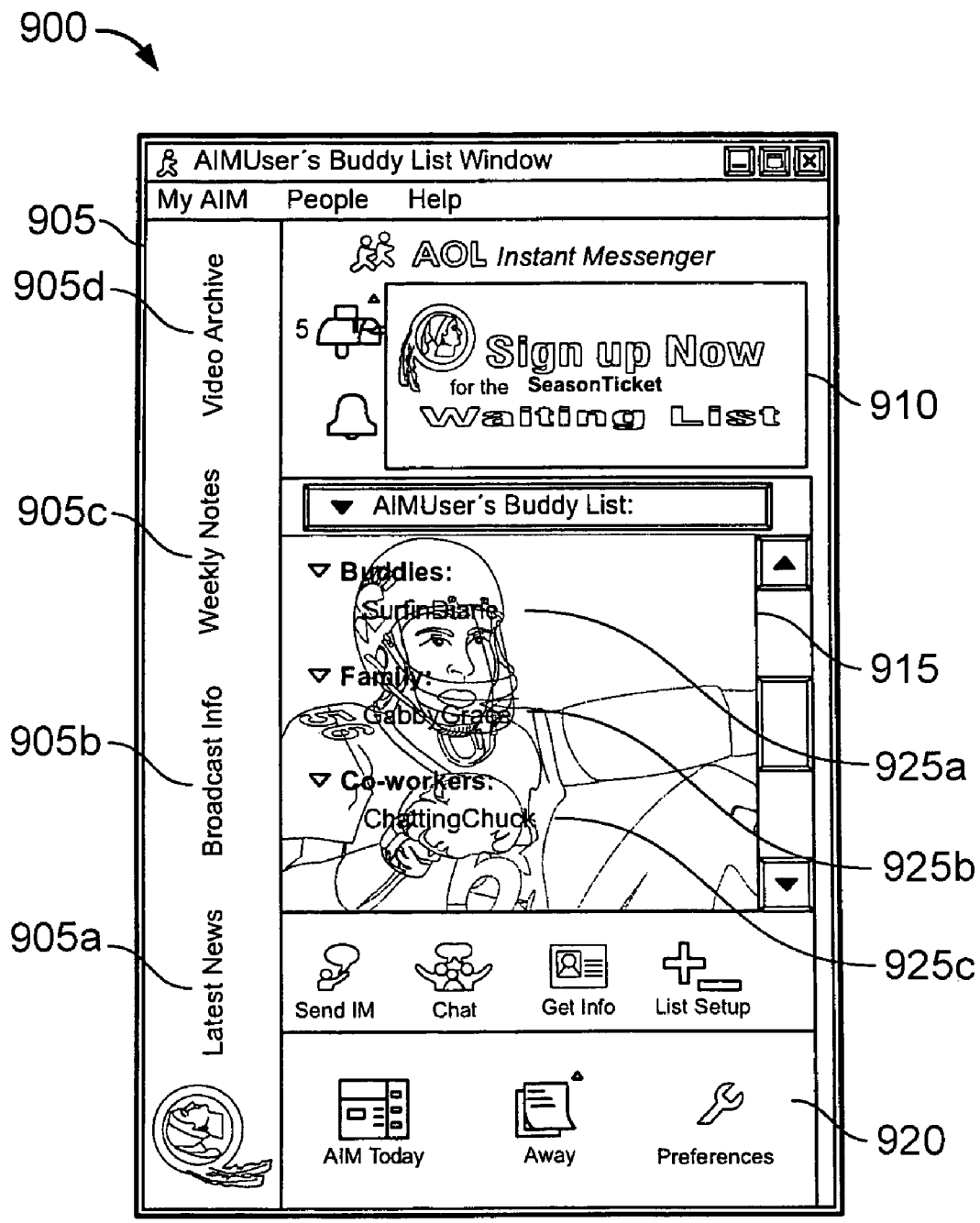

Next, an IM user interface (UI) is opened to enable selection of information to be communicated to the intended destination (step 515). FIG. 7 describes an exemplary interface available to the IM sender, which may be used to open an IM user interface, and which will be described below. Finally, the personalization items associated with the selected IM recipient are rendered in the IM UI (step 520). FIGS. 8 and 9 describe exemplary interfaces available to the IM sender which may be used when rendering the personalization items of the selected IM recipient, and which will be described below.

The IM recipient may have chosen a personalization item from a location including the IM recipient system 305, the IM host system 310, or another host system. When the IM recipient chooses a personalization item that is locally stored on the IM recipient system 305, an identifier may be created for the chosen personalization item based upon a hash of the item data. The identifier, when sent to the a remote location such as the IM host 310, may be checked to determine if the chosen personalization item is already known to the host system, and if so, whether the personalization item is designated as, for example, an official item. This allows the IM recipient to select personalization items from the IM recipient's own client system, but prevents the host system or other remote location from needing to store duplicate copies of the same items. Also, the host system or other remote location is able to determine if such items are specially designated as, for example, official items and may be rendered to users who desire to view only items so designated.

FIG. 6 illustrates an example of a UI 600 that may be presented to a user of an online service provider. The UI 600 includes a toolbar 602 for quickly enabling activation of features such as, for example, reading or writing e-mail, exchanging IM messages with another user, entering chat areas with other users, shopping or accessing the internet. The toolbar 602 may include one or more general interface actionable items 620-660, each of which is configured to enable activation of an associated user interface. An actionable item may be, for example, a button or a tab. For example, general actionable item 620 is configured to enable activation of an IM application and associated Instant Message (IM) user interface (UI) 670. A buddy list 625 is provided, and includes a list of other potential IM recipient. As shown, the IM sender is able to initiate and view a communications session with IM recipient "SurfinDiane" 625a.

FIG. 7 illustrates one example of an IM UI 700 that may be presented to an IM sender of an IM service provider. The UI 700 may be rendered after opening an IM application. In general, the UI 700 is rendered on the IM sender system 105 using software stored on the IM sender system 105.

The UI 700 includes an IM display area 705 to display the messages 705a of an active IM session. In the example of FIG. 7, the active IM session involves a conversation initiated by the IM sender having a screen name of "ChattingChuck" with the IM sender having a screen name of "SurfinDiane." An IM compose area 710 may be used to compose a message to send to the IM sender in the active IM session, and the message typically is sent by clicking on the send control button 715 in the UI. A control button 720 may be provided to close the active IM session.

The UI 700 includes personalization items 707 and 709 from the IM recipient and personalization items 712 and 714 from the IM sender. In particular, as shown in FIG. 7, the IM recipient "SurfinDiane" has made IM wallpaper 707 and a buddy icon 709 perceivable to the IM sender "ChattingChuck."

Personalization items 707 and 709 of the IM recipient may be made available to the IM sender upon activating UI 700 and without having to wait to receive a communication such as an instant message from the IM recipient. The IM sender system 105 selects the identifiers corresponding to the personalization items 707 and 709 of the IM recipient. The identifiers may be associated with a screen name or other identifying information of the IM recipient. For example, the identifiers may be associated with the screen name of the IM recipient and stored locally at the IM sender system 105, or the IM sender system may retrieve the identifiers associated with the screen name of the IM recipient from another location such as the IM host system 310 or another remotely-accessible data store such as the IM recipient system 305 or a remote or third-party server.

The IM sender system 105 uses the identifiers to determine if the corresponding personalization items are available locally at the IM sender system, and if so, the IM sender system retrieves the corresponding personalization items. If the personalization items are not available locally at the IM sender system 105, the IM sender system requests the personalization items from another location such as an IM host system 310 or another remotely-accessible data store. Once the IM sender system 105 locates or receives the personalization items of the IM recipient, the IM sender system renders the items on UI 700 for perception by the IM sender.

Examples of IM UIs 600, 700 are shown with respect to FIGS. 6 and 7. In one implementation, the IM user interface is opened after the IM recipient is selected. In another implementation, the IM user interface is opened before the IM recipient is selected. In yet another implementation, the IM user interface is opened simultaneously with the selection of the IM recipient.

FIG. 8 illustrates yet another example of an IM UI 800 that may be presented to an IM sender of an IM service provider. One or more personalization items may be provided for the IM UI. The personalization items may be rendered to the IM sender as described above with respect to FIG. 5.

In the example of FIG. 8, personalization items of an IM recipient "AIMUIGIRL" 805, 810, 820, and 825 may be made perceivable to the IM sender in the manner described above with respect to FIGS. 5, 7, and 10. In particular, the personalization items of the IM recipient to be made perceivable to the IM sender prior to receipt of a communication from the IM recipient include a sidebar image 805, a background image 810, a buddy icon 820, and a sound (not shown). The sidebar image 805 may include images and links to content. The background image 810 may include an image, and typically is a washed out image. The buddy icon 820 typically is an image. The sound may be a sound or a sequence of sounds played to the IM sender.

FIG. 9 is an example of an instant messaging buddy list UI 900 that enables an IM sender of an instant messaging service to, among other things, perceive the presence state of other buddies that the IM sender has added to a buddy list, and to send instant messages to buddies on the buddy list. The buddy list rendered to the IM sender may include personalization items of an IM recipient such as a buddy list bar 905, a buddy list image 910, a buddy list background image 915, and a buddy list fill pattern 920.

The buddy list bar 905 may contain personalized links 905a, 905b, 905c, and 905d to content and may have a customized appearance. The buddy list image 910 and the buddy list background image 915 may be, for example, image files. The buddy list background image 915 may have a washed out appearance. The buddy list fill pattern 920 may be a color or pattern background for the buddy list, or may also be an image. The transmission of the buddy list personalization items of a selected buddy for rendering on the IM sender system may occur during machine-to-machine communications that are not visible to the user.

As shown, the buddy list 900 includes buddies 925a, 925b, 925c that the IM sender has chosen to add to the buddy list. Personalization items of a given IM recipient (i.e., a buddy) may be displayed through manual selection by the IM sender, or the personalization items of a given IM recipient may be selected automatically for the IM sender such as, for example, when the IM sender activates a UI to send an IM message to a selected IM recipient.

For example, wallpaper or a different personalization item reflective of settings established for a selected buddy may be rendered on the buddy list 900 of the IM sender when the IM sender rolls a mouse pointer over the name of the buddy 925a, 925b, 925c, 925d or otherwise specifies a buddy in the buddy list 900. In another implementation, the IM sender may tie their wallpaper or other personalization item setting to follow that of a selected buddy on the buddy list 900. In other words, the wallpaper of the IM sender may be set to follow that of a selected buddy, for example buddy 925a, such that when buddy 925a makes a change to the wallpaper or other personalization item, the resulting change is reflected to the IM sender in the personalization items rendered for the IM sender.

IM personalization items of the IM recipient may be rendered by any type of hardware, software, device, computer, computer system, equipment, component, program, application, code, storage medium, or propagated signal. In one implementation, the IM personalization items may be rendered in a client/host context, and the IM personalization items may be accessed or updated through a remote device in a client/host environment. In another implementation, the IM personalization items may be implemented in a standalone or offline client context. The IM personalization items may be rendered by the standalone/offline device and may be accessed or updated through a remote device in a non-client/host environment such as, for example, a LAN (Local Area Network) server serving an end user or a mainframe serving a terminal device.

Figure 10:
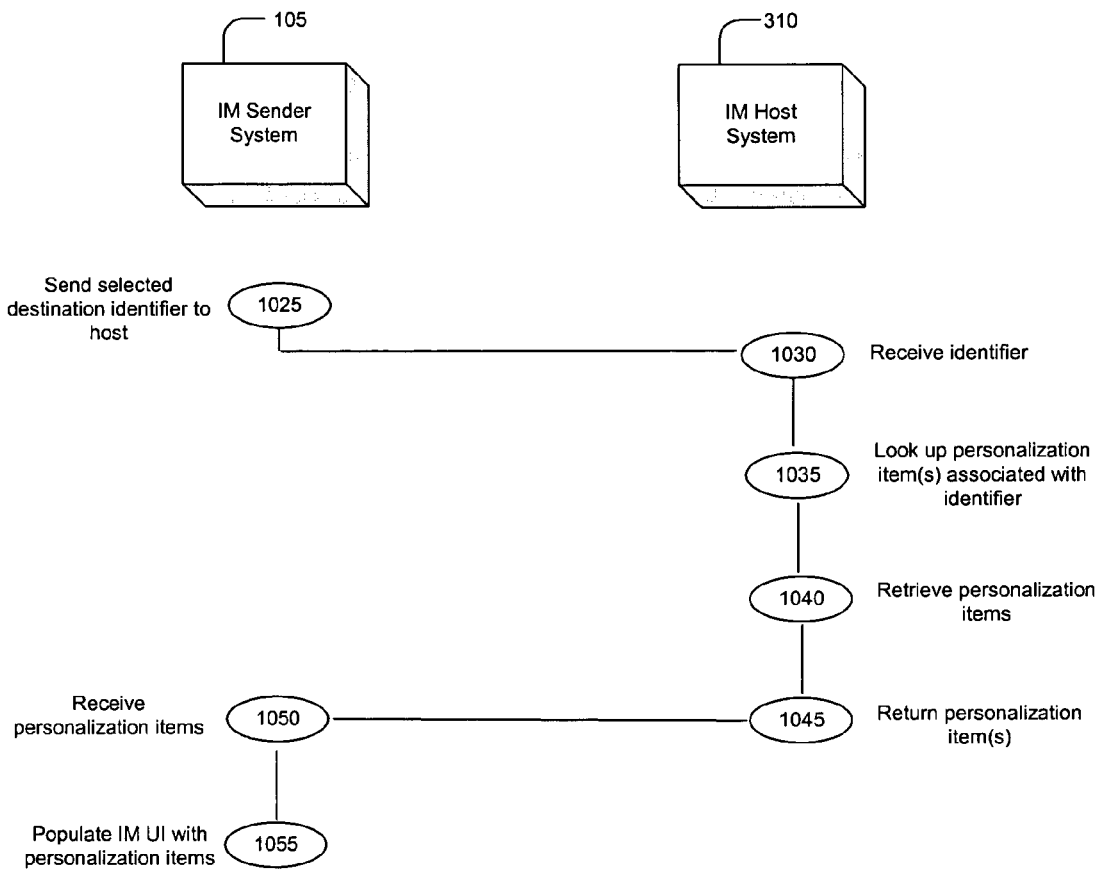

Regarding FIG. 10, procedure 1000 shows one possible implementation of rendering a personalization item associated with the selected IM recipient (step 520), as described with respect to FIG. 5. In procedure 1000, personalization items of the selected IM recipient may be made available to the IM sender system and rendered at the IM sender system based on identifiers corresponding to the personalization items of the IM recipient, which may be maintained or accessed by the IM host system 310.

In procedure 1000, the IM sender system 105 first sends the identifier corresponding to the personalization item to the IM host system 310 (step 1025). The identifiers may be associated with a screen name or other identifying information of the IM recipient. For example, the identifiers may be associated with the screen name of the IM recipient and stored locally at the IM sender system, or the IM sender system may retrieve the identifiers associated with the screen name of the IM recipient from another location, such as the IM host system or another remotely-accessible data store.

The IM host system 310 receives the identifier from the IM sender system 105 (step 1030).

Next, the IM host system 310 looks up the personalization item(s) associated with the identifier (step 1035), and retrieves the personalization item(s) corresponding to the identifier (step 1040). In other words, the IM sender system uses the identifier to determine if the corresponding personalization item is available locally at the IM sender system, and if so, the IM sender system retrieves the corresponding personalization item. When the personalization item is not available locally at the IM sender system, the IM sender system 105 requests the personalization item by sending the selected identifier to the IM host system 310 or another remotely-accessible data store (not shown). Alternatively, the personalization item itself may be associated with the IM recipient and retrieved by the IM sender system 105.

Ultimately, the personalization item(s) are returned to the IM sender system 105 (step 1045).

The corresponding personalization item(s) are received by the IM sender system 105 (step 1050). Receiving the corresponding personalization item may include saving (e.g., caching) the personalization item in a memory or other storage at the local IM sender system 105.

Finally, the IM UI is populated with the personalization item(s) (step 1055). That is, once the IM sender system locates or receives the personalization item, the IM sender system renders the item for perception by the IM sender. As shown with respect to FIG. 7, the personalization items to be populated may include a buddy icon 709 or IM wallpaper 707.

The relative order of steps 505-530 with respect to other steps in procedure 500, and the relative order of steps 1025-1055 with respect to other steps in procedure 1000, and also with respect to each other, may vary. Also, certain steps may be omitted entirely, as appropriate.

Figure 11:
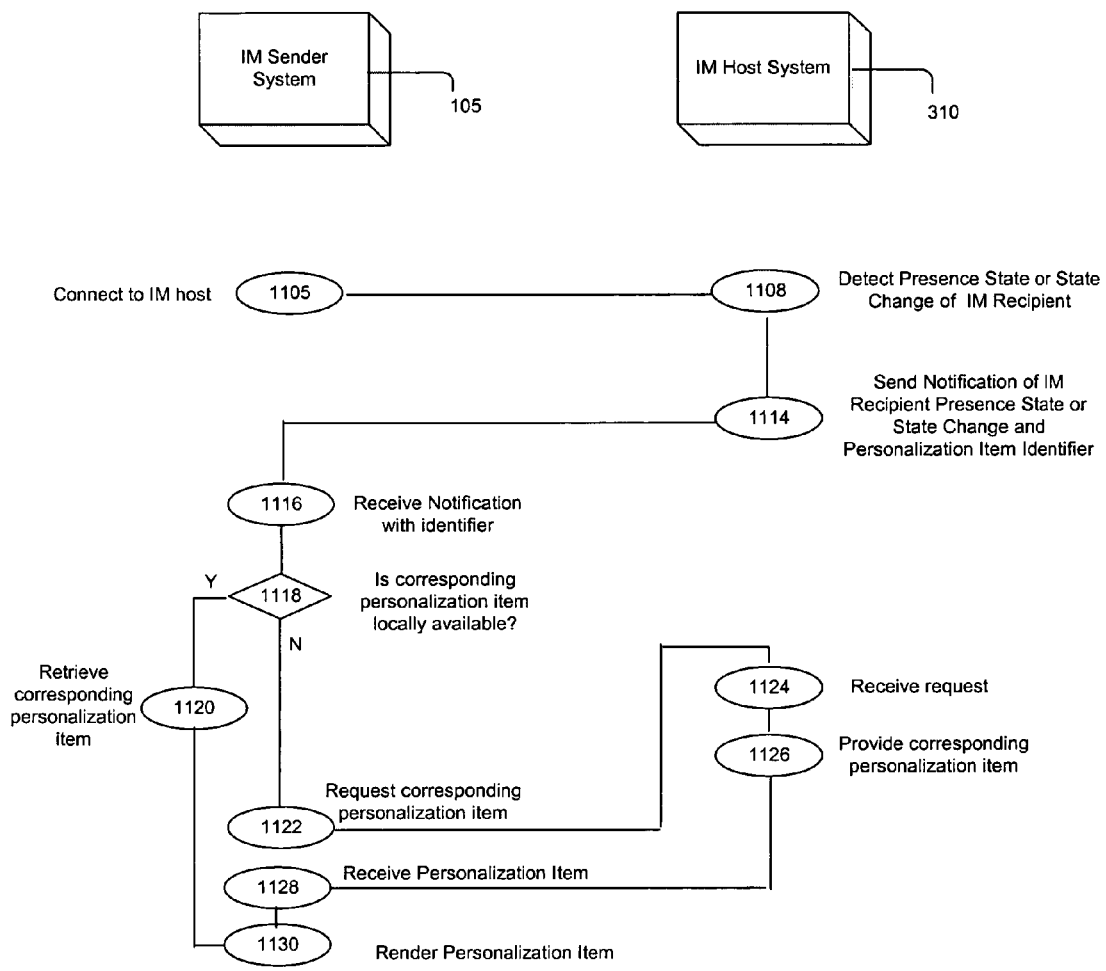
FIGS. 11 and 12 are flow charts of exemplary processes that may be implemented by systems such as those of FIGS. 1-4.
Figure 12:
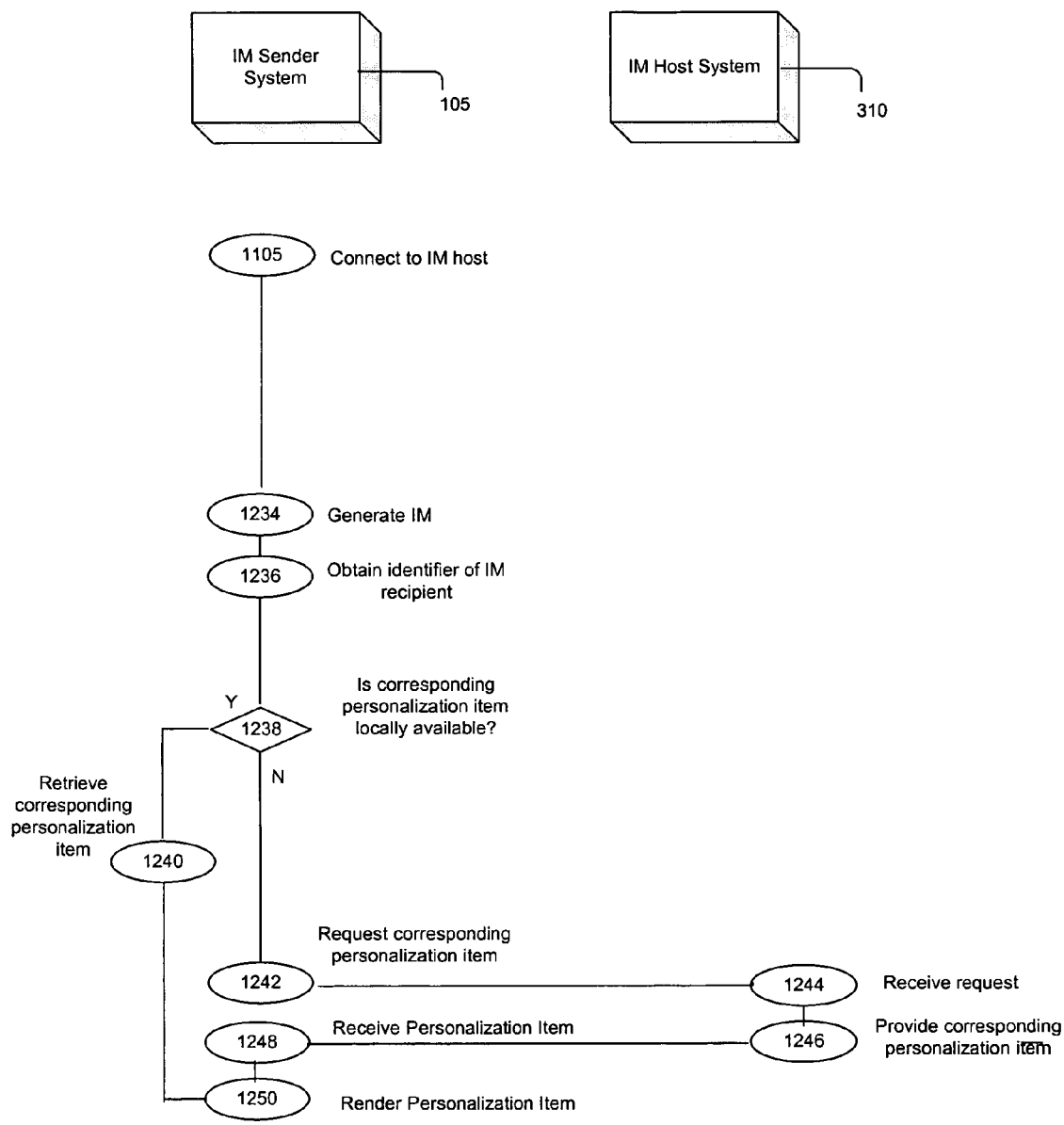

FIGS. 11 and 12 show one possible implementation of the procedures discussed with respect to FIGS. 5 and 10. The IM sender system 105 and the IM host system 310 interact according to exemplary procedures 1100 and 1200 to make a personalization item selected by the IM recipient perceivable to the IM sender during an instant messaging communications session. FIGS. 11 and 12 differ from FIGS. 5 and 10 in that personalization items are made available in response to a triggering event (e.g., a detected change in presence of a user being monitored) rather than in response to invocation of an application or application interface.

Referring to FIG. 11, in the procedure 1100, the IM sender system 105 and the IM host system 310 are physically and/or logically connected (step 1105). For instance, IM sender system 105 may connect to the IM host system 310 across a network (e.g., network 160) by supplying an IM sender identification and password to a server (e.g., a login server) in order to obtain access to the IM host system 310.

Next, the presence state or presence state change of the IM recipient system 305, e.g., login state, is detected by the IM host system 310 (step 1108). The IM host system 310 may detect presence states or state changes, such as, for example, when the IM recipient signs out, is inactive for a period of time, becomes active after having been inactive for a period of time, indicates an ability to receive instant messages, or indicates an inability to receive instant messages. A pool of potential IM recipients may be monitored and associated with the screen name of a sender through use of a buddy list or similar mechanism. Alternatively, the entire user base may be monitored or some intelligent method of monitoring potential IM recipients may be used. The IM sender may select one or more IM recipient to whom the IM sender may wish to send an instant message.

After detecting the presence state or state change of the IM recipient system 305, the IM host system 310 may send or otherwise make accessible to the IM sender system 105 and other IM systems a notification of the IM recipient presence state change or state change (step 1114). Sending notification of the presence state change may include sending an identifier corresponding to a personalization item selected by the IM recipient system 305. For example, the IM host system 310 may send an identifier corresponding to a sound chosen by the IM recipient for the presence state change.

In one implementation, the IM host system 310 assigns an identifier to the personalization item. In another implementation, the IM recipient system 305 assigns the identifier to the personalization item. In yet another implementation, the identifier is assigned by a host system other than the IM host system 310.

The identifier typically includes information allowing the corresponding personalization item to be located and retrieved. For example, the identifier may include a location of the personalization item. The identifier also may include a type identifier that identifies the personalization item as, for example, an icon, an IM wallpaper, an emoticon, or a sound. The type identifier also may include a file format of the personalization item. Also, the identifier may include one or more flags to indicate, for example, if the personalization item is a custom item or an "official" item, has been banned, or has expired. Another flag may redirect the sender to a different personalization item. The identifier may further include information concerning the size of the personalization item. The identifier may be in a predetermined format and may be of a predetermined length.

The IM sender system 105 receives the notification from the IM host system 310 (step 1116). In the above example, receiving the notification may include receiving an identifier corresponding to a personalization item selected by the IM recipient system 305.

Next, the IM sender system 105 determines whether the corresponding personalization item is locally available (step 1118). For example, the IM sender system 105 may have stored the personalization in a local memory or another local storage location. The IM sender system uses the identifier to determine whether the corresponding personalization item is locally available. For instance, the identifier may contain the location at which the corresponding personalization item is stored.

If the corresponding personalization item is available locally, the IM sender system retrieves the corresponding personalization item (step 1120) and renders the personalization item (step 1130).

Otherwise, if the corresponding personalization item is not available locally, the IM sender system 105 requests the corresponding personalization item from the IM host system 310 or a location otherwise specified by or inferred from the identifier (step 1122). That is, the IM sender system 105 may request the corresponding personalization item from another location such as the IM recipient system 305 or a remote, third party server. Requesting the corresponding personalization item may include sending the identifier associated with the personalization item to the IM host system 310 along with a request to download the personalization item to the IM sender system 105.

When the IM host system 310 receives the request for a personalization item from the IM sender system (step 1124), the IM host system 310 provides the corresponding personalization item to the IM sender system (step 1126). Receiving the request may include having the IM host system 310 receive the identifier associated with the personalization item along with a request to download the personalization item to the IM sender system 105.

Next, the corresponding personalization item is received by the IM sender system (step 1128), which may save the personalization item in a memory or other storage at the local IM sender system 105. Then, the personalization item is rendered (step 1130). For example, as discussed with respect to FIG. 9, the personalization items may include personalization items for a buddy list UI 900.

Referring to FIG. 12, in procedure 1200, an instant message application is opened by the IM sender system 105 (step 1235), in a similar manner to that discussed with respect to step 505 of FIG. 5. The IM sender may also open an IM UI, such as the UI 700 shown in FIG. 7 and select an intended destination recipient, as discussed above with respect to steps 510 and 515 of FIG. 5. In one implementation, rather than relying on a mechanism such as a buddy list or a state change to identify users for which personalization items will be made available, a mechanism identifies the users for which personalization items will be made available based on users selected by the IM senders for communications.

To make the personalization items of the IM recipient (for example personalization items 707 and 709) available to the IM sender (for example, in UI 700), the IM sender system 105 selects the identifiers corresponding to the personalization items (for example, 707 and 709) of the IM recipient. The identifiers may be associated with a screen name or other identifying information of the IM recipient. As such, personalization items of the IM recipient may be made available to the IM sender before the receipt by the IM sender of an IM from the IM recipient.

The IM sender system 105 uses the identifiers to identify the personalization item associated with the recipient, and to locate perceivable content corresponding to the identifier.

Because various aspects of steps 1236-1250 are similar to those discussed above with respect to steps 1116-1130 of procedure 1100, the following discussion of steps 1236-1250 is somewhat abbreviated.

The IM sender system 105 obtains an identifier from the IM host system 310 (step 1236) corresponding to the personalization item selected by the IM sender system 105, as discussed above with respect to step 1116.

Next, the IM sender system 105 determines whether the corresponding personalization item is available locally (step 1238). As discussed above with respect to step 1118, the IM sender system 105 may have stored the personalization in a local memory or other local storage location. The IM sender system 105 uses the identifier to determine whether the corresponding personalization is available locally. For instance, the identifier may contain the location at which the corresponding personalization item is stored.

If the corresponding personalization item is available locally, the IM sender system 105 retrieves the corresponding personalization item (step 1240) and the personalization item is rendered (step 1250).

Otherwise, if the corresponding personalization item is not available locally, the IM sender system 105 requests the corresponding personalization item from the IM host system 310 (step 1242). Alternatively, as discussed above with respect to step 1122, the IM sender system 105 may request the corresponding personalization item from another location. In one implementation, the personalization item may be provided by a third party, and may be made available in consideration of a payment by the IM sender or the IM recipient. Requesting the corresponding personalization item may include sending to the IM host system 310 the identifier associated with the personalization item along with a request to download the personalization item to the IM sender system 105.

The IM host system 310 receives the request for the personalization item from the IM sender system 105 (step 1244). As discussed above with respect to step 1124, receiving the request may include receiving the identifier associated with the personalization item along with a request to download the personalization item to the IM sender system 105. The IM host system 310 provides the corresponding personalization item to the IM sender system 105 (step 1246).

The corresponding personalization item is received by the IM sender system 105 (step 1248). As discussed above with respect to step 1128, receiving the corresponding personalization item may include saving the personalization item in a memory or other storage at the local IM sender system 105.

Finally, the personalization item is rendered (step 1250). As discussed with respect to FIG. 7, the personalization item to be rendered may include a buddy icon 709 or IM wallpaper 707.

The relative order of steps 1105-1130 with respect to other steps in procedure 1100, and the relative order of steps 1235-1250 with respect to other steps in procedure 1200, and also with respect to each other, may vary. Also, certain steps may be omitted entirely, as appropriate. For example, referring to FIG. 11, if the IM recipient has not chosen a personalization item to be sent to the IM sender system 105 upon a presence state change, then no such item will be sent and steps 1116-1130 may be eliminated entirely.

In one implementation, a buddy icon of an IM recipient may be shown in a buddy list, or other personalization items of an IM recipient may be shown in a buddy list.

In another implementation, the IM recipient and/or the IM sender pay a subscription fee to access/use certain personalization items, and the personalization items may be provided by a third party such as a server other than the IM host 310. In another implementation, the personalization items expire and must be replaced after a predetermined event such as a predetermined length of time, passage of a predetermined date, or a predetermined number of uses. Also, a personalization item may be banned if, for example, it is deemed to be offensive, inappropriate, or to otherwise violate a term of service agreement. If it is determined that the personalization item is expired or banned, display of such a personalization item will be disallowed and the user typically will be required to choose a different personalization item.

Other implementations are within the scope of the following claims. For example, one identifier could correspond to a group of personalization items, or a personalization item could have more than one identifier. As a further example, although the examples above are given in an instant message context, other communications systems with similar attributes may be used. For example, personalization items may be used in a chat room or in e-mail communications. Also, the user interface may be a viewable interface, an audible interface, a tactile interface, or any combination of these.

What is claimed is:

1. A computer implemented method for enabling perception of personalization items associated with an instant messaging communications session, the method comprising:

receiving, from an instant message sender system, information that indicates a user identifier of an intended instant message recipient, the user identifier of the intended instant message recipient being selected by an instant message sender from among one or more user identifiers of potential instant message recipients, the potential instant message recipients being users that are perceived by the instant message sender as being presently available to receive an instant message from the instant message sender;

accessing the user identifier of the intended instant message recipient based upon the received information;

accessing the personalization items based on the accessed user identifier of the intended instant message recipient, the personalization items being designated by the intended instant message recipient; and making perceivable the accessed personalization items to the instant messaging sender system for rendering in an instant messaging application user interface running on the instant messaging sender system;

rendering of the personalization items in the user interface, wherein the rendering includes rendering of a window, wherein the rendering of the window includes displaying the personalization items and an input text field for inputting a text message by the instant message sender for delivery to the intended instant message recipient in an instant message, the displayed personalization items includes image items, wherein the rendering of the window makes the personalization items and the input text field displayed to the instant message sender prior to communication with the intended instant message recipient, wherein the selection by the instant message sender of the user identifier of the intended instant message recipient is an indication of an intention of the instant message sender to communicate with the intended instant message recipient, and wherein the rendering of the window at the instant messaging sender system occurs in response to the selection by the instant message sender of the user identifier of the intended instant message recipient from among the one or more user identifiers of potential instant message recipients.

2. The method of claim 1 further comprising storing one or more personalization items on a host system.

3. The method of claim 1 in which accessing personalization items comprises accessing personalization items on a host system.

4. The method of claim 3 further comprising communicating the personalization items from the host system to the instant message sender system.

5. The method of claim 1 in which the personalization items are made perceivable prior to communication of an instant message with the intended instant message recipient.

6. The method of claim 1 in which the personalization items are made perceivable before a communications session is established with the intended instant message recipient.

7. The method of claim 1 in which the personalization items are made perceivable before the instant message sender system sends a message to the intended instant message recipient.

8. The method of claim 1 in which the personalization items are made perceivable before the instant message sender system receives a message from the intended instant message recipient.

9. The method of claim 1 in which accessing the identifiers comprises:

receiving an identity of the potential instant message recipients; and accessing an identifier associated with each of the individual potential instant message recipient based upon the received identity.

10. The method of claim 1 in which accessing the one or more identifiers comprises receiving an identifier comprising a location of the personalization item.

11. The method of claim 10 in which the location of the personalization item comprises a location on a host system.

12. The method of claim 10 in which the one or more identifiers include an item type and a data size.

13. The method of claim 10 wherein the one or more identifiers include a flag.

14. The method of claim 13 wherein the flag includes one or more of a custom item flag, an official item flag, a banned item flag, and a redirect to different item flag.

15. The method of claim 1 in which accessing personalization items comprises accessing a graphic.

16. The method of claim 15 in which the graphic comprises an icon.

17. The method of claim 1 in which accessing personalization items comprises accessing a sound.

18. The method of claim 1 in which accessing personalization items comprises accessing wallpaper capable of being rendered on an instant messaging application user interface.

19. The method of claim 1 in which accessing personalization items comprises accessing an animation sequence.

20. The method of claim 1 in which accessing personalization items comprises accessing a video segment.

21. The method of claim 1 in which accessing personalization items comprises accessing a customized binary object provided by the intended instant message recipient.

22. The method of claim 1 in which accessing personalization items comprises accessing a personalization item provided by a party other than the intended instant message recipient.

23. The method of claim 22 in which accessing personalization items comprises accessing a personalization item enabled to be rendered in consideration of a payment.

24. The method of claim 1 in which accessing personalization items comprises accessing a personalization item configured to expire upon the occurrence of a predetermined event.

25. The method of claim 24 in which the predetermined event comprises passage of a predetermined length of time or passage of a predetermined date.

26. The method of claim 24 in which the predetermined event comprises a predetermined number of uses of the personalization item.

27. The method of claim 24 further comprising:
determining whether the personalization item has expired, and
disallowing access to the personalization item if the personalization item has expired.

28. The method of claim 1 further comprising:
determining whether the personalization items have been banned, and
disallowing access to a personalization item if the personalization item has been banned.

29. The method of claim 1 wherein the personalization items are made perceivable to the instant message sender after initiation of an instant messaging communications session between the instant message sender and the intended instant message recipient, and before communication of an instant message between the instant message sender and the intended instant message recipient.

30. The method of claim 1 wherein the personalization items are made perceivable prior to communication of any instant message between the instant message sender and the intended instant message recipient.

31. The method of claim 1 further comprising making perceivable to the instant message sender an aggregate display in the window that includes personalization items corresponding to the instant message sender and the personalization items corresponding to the intended instant message recipient.

32. A computer program, stored on a computer readable storage medium, the computer program comprising instructions for:
receiving, from an instant message sender system, information that indicates a user identifier of an intended instant message recipient, the user identifier of the intended instant message recipient being selected by an instant message sender from among one or more user identifiers of potential instant message recipients, the potential instant message recipients being users that are perceived by the instant message sender as being presently available to receive an instant message from the instant message sender;
accessing the user identifier of the intended instant message recipient based on the received information;
accessing personalization items based on the accessed user identifier of the intended instant message recipient, the personalization items being designated by the intended instant message recipient; and
making perceivable the accessed personalization items to the instant messaging sender system for rendering in an instant messaging application user interface running on the instant messaging sender system;
rendering of the personalization items in the user interface, wherein the rendering includes the rendering of a window,
wherein the rendering of the window includes displaying including the personalization items and an input text field for inputting a text message by the instant message sender for delivery to the intended instant message recipient in an instant message, the displayed personalization items including image items,
wherein the rendering of the window makes the personalization items and the input text field perceivable to the instant message sender prior to communication with the intended instant message recipient,
wherein the selection by the instant message sender of the user identifier of the intended instant message recipient is an indication of an intention of the instant message sender to communicate with the intended instant message recipient, and
wherein the rendering of the window at the instant messaging sender system occurs in response to the selection by the instant message sender of the user identifier of the intended instant message recipient from among the one or more user identifiers of potential instant message recipients.

33. The computer program of claim 32 further comprising instructions for storing one or more personalization items.

34. The computer program of claim 32 in which the personalization items are made perceivable prior to communication of an instant message with the intended instant message recipient.

35. The computer program of claim 32 in which the personalization items are made perceivable before a communications session is established with the intended instant message recipient.

36. The computer program of claim 32 in which the personalization items are made perceivable before the instant message sender system sends a message to the intended instant message recipient.

37. The computer program of claim 32 in which the personalization items are made perceivable before the instant message sender system receives a message from the intended instant message recipient.

38. The computer program of claim 32 in which instructions for accessing the identifier comprises instructions for:
receiving an identity of the potential instant message recipients; and
accessing an identifier associated with the potential instant message recipient based upon the received identity.

39. The computer program of claim 32 in which instructions for accessing personalization items comprises instructions for accessing a personalization item configured to expire upon the occurrence of a predetermined event.

40. The computer program of claim 39 in which the predetermined event comprises passage of a predetermined length of time or passage of a predetermined date.

41. The computer program of claim 39 in which the predetermined event comprises a predetermined number of uses of the personalization item.

42. The computer program of claim 32 wherein the personalization items are made perceivable to the instant message sender after initiation of an instant messaging communications session between the instant message sender and the intended instant message recipient, and before communication of an instant message between the instant message sender and the intended instant message recipient.

43. The method of claim 42 further comprising displaying a personalization item associated with the instant message sender with the personalization item associated with the intended instant message recipient in an aggregate display in the window prior to communication with the instant message recipient system.

44. The computer program of claim 32 wherein the personalization items are made perceivable prior to communication of any instant message between the instant message sender and the intended instant message recipient.

45. The computer program of claim 32 further comprising instructions for making perceivable to the instant message sender an aggregate display in the window that includes personalization items corresponding to the instant message sender and the personalization items corresponding to the intended instant message recipient.

46. A computer implemented method for enabling perception of personalization items in an instant messaging communications session, the method comprising:
selecting, on an instant message sender system, information that indicates a user identifier of an intended instant message recipient, the user identifier of the intended instant message recipient being selected by an instant message sender from among one or more user identifiers of potential instant message recipients, the potential instant message recipients being users that are perceived by the instant message sender as being presently available to receive an instant message from the instant message sender;
rendering, on the instant message sender system, an instant messaging application user interface for an instant messaging communications session involving at least an intended instant message recipient and an instant message sender; and
rendering, at the instant message sender system, the personalization items associated with the intended instant message recipient and selected by the intended instant message recipient in the user interface, wherein:
the rendering of the personalization item in the user interface includes the rendering of a window,
the rendering of the window includes displaying the personalization items and an input text field for inputting text message by the instant message sender for delivery to the intended instant message recipient in an instant message, the displayed personalization items including image items,
the rendering of the window occurs prior to communication with the intended instant message recipient,
the selection by the instant message sender of the user identifier of the intended instant message recipient is an indication of an intention of the instant message sender to communicate with the intended instant message recipient, and
the rendering of the window at the instant messaging sender system occurs in response the selection by the instant message sender of the user identifier of the intended instant message recipient from among the one or more user identifiers of potential instant message recipients.

47. The method of claim 46 in which rendering at the instant message sender system comprises rendering at the instant message sender system prior to communication of an instant message with the intended instant message recipient.

48. The method of claim 46 in which rendering at the instant message sender system comprises rendering at the instant message sender system before a communications session is established with the intended instant message recipient.

49. The method of claim 46 in which rendering at the instant message sender system comprises rendering at the instant message sender system before the instant message sender system sends a message to the intended instant message recipient.

50. The method of claim 46 in which rendering at the instant message sender system comprises rendering at the instant message sender system before the instant message sender system receives a message from the intended instant message recipient.

51. The method of claim 46 further comprising:
obtaining an identifier of the personalization item; and
obtaining the personalization item using the identifier of the personalization item from a source other than a message used to obtain the identifier.

52. The method of claim 51 in which obtaining the identifier of the personalization item comprises:
sending an identity of the intended instant message recipient to an instant message host system, the instant message host system storing one or more identifiers associated with one or more personalization items for the intended instant message recipient; and
receiving an identifier associated with the individual intended instant message recipient in a message from the instant message host system.

53. The method of claim 51 in which obtaining the identifier of the personalization item comprises locating the identifier at an intended instant message recipient system.

54. The method of claim 51 in which obtaining the identifier of the personalization item comprises retrieving the identifier from a remote data store.

55. The method of claim 51 in which obtaining the personalization item comprises:

determining whether the personalization item associated with the obtained identifier is available at the instant message sender system;

retrieving the personalization item from the instant message sender system if the personalization item is available at the instant message sender system; and requesting the personalization item from a remote source and receiving the personalization item from the remote source at the instant message sender system if the personalization item is not available at the instant message sender system.

56. The method of claim 55 in which requesting the personalization item further comprises identifying the remote source.

57. The method of claim 55 in which requesting the personalization item comprises requesting the personalization item from an instant messaging host.

58. The method of claim 55 in which requesting the personalization item comprises requesting the personalization item from a third-party server.

59. The method of claim 58 in which requesting the personalization item from a third-party server comprises requesting the personalization item from a server authorized as a partner to an instant messaging host.

60. The method of claim 51 in which obtaining the identifier of the personalization item comprises receiving the identifier upon a change in a presence state of the intended instant message recipient.

61. The method of claim 51 in which obtaining the personalization item comprises obtaining a graphic.

62. The method of claim 61 in which the graphic comprises an icon.

63. The method of claim 51 in which obtaining the personalization item comprises obtaining a sound.

64. The method of claim 51 in which obtaining the personalization item comprises obtaining wallpaper capable of being rendered on an instant messaging application user interface.

65. The method of claim 51 in which obtaining the personalization item comprises obtaining an animation sequence.

66. The method of claim 51 in which obtaining the personalization item comprises obtaining a video segment.

67. The method of claim 51 in which obtaining the personalization item comprises obtaining a customized binary object provided by the intended instant message recipient.

68. The method of claim 51 in which obtaining the personalization item comprises obtaining a personalization item provided by a party other than the intended instant message recipient.

69. The method of claim 68 in which obtaining the personalization item comprises obtaining a personalization item enabled to be rendered in consideration of a payment.

70. The method of claim 51 in which obtaining the personalization item comprises obtaining a personalization item configured to expire upon the occurrence of a predetermined event.

71. The method of claim 70 in which the predetermined event comprises passage of a predetermined length of time or passage of a predetermined date.

72. The method of claim 70 in which the predetermined event comprises a predetermined number of uses.

73. The method of claim 70 further comprising:
determining whether the personalization item has expired, and
disallowing display of the personalization item if the personalization item has expired.

74. The method of claim 51 in which obtaining the identifier further comprises obtaining an identifier comprising a location of the personalization item.

75. The method of claim 74 in which the identifier further comprises an item type and a data size.

76. The method of claim 74 wherein the identifier further comprises a flag.

77. The method of claim 76 wherein the flag further comprises one or more of a custom item flag, an official item flag, a banned item flag, and a redirect to different item flag.

78. The method of claim 46 further comprising:
determining whether the personalization item has been banned, and
disallowing display of the personalization item if the personalization item has been banned.

79. The method of claim 46 further comprising updating the personalization item.

80. The method of claim 46 wherein rendering the personalization item associated with the instant message recipient comprises displaying the personalization item associated with the instant message recipient and selected by the intended instant message recipient in the window.

81. A computer program, stored on a computer readable storage medium, the computer program comprising instructions for:

selecting, on an instant message sender system, information that indicates a user identifier of an intended instant message recipient, the user identifier of the intended instant message recipient being selected by an instant message sender from among one or more user identifiers of potential instant message recipients, the potential instant message recipients being users that are perceived by the instant message sender as being presently available to receive an instant message from the instant message sender;

rendering, on the instant message sender system, an instant messaging application user interface for an instant messaging communications session involving at least an intended instant message recipient and an instant message sender; and rendering, at the instant message sender system, personalization items associated with the intended instant message recipient and selected by the intended instant message recipient in the user interface, wherein:

the rendering of the personalization item in the user interface includes the rendering of a window, the rendering of the window includes displaying the window including the personalization item and an input text field for inputting text message by the instant message sender for delivery to the intended instant message recipient in an instant message, the displayed personalization items including image items, the rendering of the window occurs prior to communication with the intended instant message recipient system, the selection by the instant message sender of the user identifier of the intended instant message recipient is an indication of an intention of the instant message sender to communicate with the intended instant message recipient, and the rendering of the window at the instant messaging sender system occurs in response to the selection by the instant message sender of the user identifier of the intended instant message recipient from among the one or more user identifiers of potential instant message recipients.

82. The computer program of claim 81 in which instructions for rendering at the instant message sender system comprises instructions for rendering at the instant message sender system prior to communication of an instant message with the intended instant message recipient system.

83. The computer program of claim 81 in which instructions for rendering at the instant message sender system comprises instructions for rendering at the instant message sender system before a communications session is established with the intended instant message recipient system.

84. The computer program of claim 81 in which instructions for rendering at the instant message sender system comprises instructions for rendering at the instant message sender system before the instant message sender system sends a message to the intended instant message recipient system.

85. The computer program of claim 81 in which instructions for rendering at the instant message sender system comprises instructions for rendering at the instant message sender system before the instant message sender system receives a message from the intended instant message recipient system.

86. The computer program of claim 81 further comprising instructions for:
obtaining an identifier of the personalization item; and
obtaining the personalization item using the identifier of the personalization item from a source other than a message used to obtain the identifier.

87. The computer program of claim 86 in which instructions for obtaining the identifier of the personalization item comprises instructions for:
sending an identity of the intended instant message recipient to an instant message host system, the instant message host system storing one or more identifiers associated with one or more personalization items for the intended instant message recipient; and
receiving an identifier associated with the individual intended instant message recipient in a message from the instant message host system.

88. The computer program of claim 86 in which instructions for obtaining the identifier of the personalization item comprises instructions for locating the identifier at the intended instant message recipient system.

89. The computer program of claim 86 in which instructions for obtaining the identifier of the personalization item comprises instructions for retrieving the identifier from a remote data store.

90. The computer program of claim 86 in which instructions for obtaining the personalization item comprises instructions for:
determining whether the personalization item associated with the received identifier is available at the instant message sender system;
retrieving the personalization item from the instant message sender system if the personalization item is available at the instant message sender system; and
requesting the personalization item from a remote source and receiving the personalization item from the remote source at the instant message sender system if the personalization item is not available at the instant message sender system.

91. The computer program of claim 86 in which instructions for obtaining the personalization item comprises instructions for obtaining a graphic.

92. The computer program of claim 86 in which instructions for obtaining the personalization item comprises instructions for obtaining a sound.

93. The computer program of claim 86 in which instructions for obtaining the personalization item comprises instructions for obtaining wallpaper capable of being rendered on an instant messaging application user interface.

94. The computer program of claim 86 in which instructions for obtaining the personalization item comprises instructions for obtaining an animation sequence.

95. The computer program of claim 86 in which instructions for obtaining the personalization item comprises instructions for obtaining a video segment.

96. The computer program of claim 86 in which instructions for obtaining the personalization item comprises instructions for obtaining a customized binary object provided by the intended instant message recipient.

97. The computer program of claim 86 in which instructions for obtaining the personalization item comprises instructions for obtaining a personalization item configured to expire upon the occurrence of a predetermined event.

98. The computer program of claim 97 in which the predetermined event comprises passage of a predetermined length of time or passage of a predetermined date.

99. The computer program of claim 97 in which the predetermined event comprises a predetermined number of uses of the personalization item.

100. The computer program of claim 97 further comprising instructions for:
determining whether the personalization item has expired, and
disallowing display of the personalization item if the personalization item has expired.

101. The computer program of claim 81 further comprising instructions for:
determining whether the personalization item has been banned, and
disallowing display of the personalization item if the personalization item has been banned.

102. The computer program of claim 81 wherein rendering the personalization item associated with the instant message recipient comprises displaying the personalization item associated with the instant message recipient and selected by the intended instant message recipient in the window.

103. The computer program of claim 102 further comprising instructions for displaying a personalization item associated with the instant message sender with the personalization item associated with the intended instant message recipient in an aggregate display in the window prior to communication with the instant message recipient system.

104. A method comprising:
presenting a display of one or more user identifiers that identify potential instant message recipients, the one or more user identifiers being displayed in a user interface configured to receive an indication of an intention to communicate through manipulation of the user interface;
receiving a selection from an instant message sender of a user identifier from among the one or more user identifiers, the selected user identifier identifying an intended instant message recipient and the selection of the user identifier indicating an intention to communicate with the intended instant message recipient;
accessing graphical personalization items based on the selected user identifier, the graphical personalization items being designated by the intended instant message recipient; and rendering a window in an instant messaging user interface,
the rendering of the window including the display of the graphical personalization items and an input text field for inputting a text message by the instant message sender for subsequent delivery to the intended instant message recipient in an instant message, the rendering of the window occurring in response to receiving the selection of the user identifier that indicates an intention to communicate with the intended instant message recipient and the rendering of the window occurring prior to communication with the intended instant message recipient.

105. The method of claim 104 wherein rendering the personalization items associated with the intended instant message recipient comprises rendering the personalization items immediately upon rendering the window.

106. The method of claim 104, wherein presenting a display of one or more user identifiers associated with potential instant message recipients comprises presenting a display of one or more screen names associated with the potential instant message recipients.

107. The method of claim 104, wherein receiving a selection of a user identifier comprises receiving a selection of a user identifier from an instant message sender and further comprising displaying personalization items associated with the instant message sender with the personalization items associated with the intended instant message recipient in an aggregate display in the window prior to communication with the intended instant message recipient.

* * * * *